(12) United States Patent
Wang et al.

(10) Patent No.: US 8,040,857 B2
(45) Date of Patent: Oct. 18, 2011

(54) SYSTEM AND METHOD FOR TIMESLOT AND CHANNEL ALLOCATION

(75) Inventors: Xudong Wang, Kirkland, WA (US); Yun Wu, San Diego, CA (US); Chao Gui, San Diego, CA (US); Xiaojing Tao, San Diego, CA (US); Weilin Wang, San Diego, CA (US); Michael Nova, Del Mar Mesa, CA (US)

(73) Assignee: Misonimo Chi Acquisitions L.L.C., Dover, DE (US)

( * ) Notice: Subject to any disclaimer, the term of this patent is extended or adjusted under 35 U.S.C. 154(b) by 805 days.

(21) Appl. No.: 11/952,948

(22) Filed: Dec. 7, 2007

(65) Prior Publication Data

US 2008/0137620 A1    Jun. 12, 2008

Related U.S. Application Data

(60) Provisional application No. 60/869,002, filed on Dec. 7, 2006.

(51) Int. Cl.
*H04J 3/00* (2006.01)
*H04B 7/204* (2006.01)

(52) U.S. Cl. .................. 370/337; 370/322; 455/450
(58) Field of Classification Search .................. 370/337, 370/322; 455/450
See application file for complete search history.

(56) References Cited

U.S. PATENT DOCUMENTS

| 4,706,689 A | 11/1987 | Man |
| 5,309,437 A | 5/1994 | Perlman et al. |
| 5,699,355 A | 12/1997 | Natarajan |
| 5,844,905 A | 12/1998 | McKay et al. |
| 5,940,771 A | 8/1999 | Gollnick et al. |
| 5,943,322 A | 8/1999 | Mayor et al. |
| 5,959,999 A | 9/1999 | An |
| 6,003,007 A | 12/1999 | DiRienzo |
| 6,023,563 A | 2/2000 | Shani |
| 6,076,066 A | 6/2000 | DiRienzo et al. |
| 6,122,516 A | 9/2000 | Thompson et al. |
| 6,161,104 A | 12/2000 | Stakutis et al. |
| 6,173,387 B1 | 1/2001 | Baxter et al. |

(Continued)

FOREIGN PATENT DOCUMENTS

WO    2004/104722    12/2004

(Continued)

OTHER PUBLICATIONS

International Search Report for PCT/US07/69031 mailed May 13, 2008.

(Continued)

*Primary Examiner* — Kenny S Lin
(74) *Attorney, Agent, or Firm* — McDonnell Boehnen Hulbert & Berghoff LLP

(57) ABSTRACT

A distributed multi-channel TDMA MAC time slot and channel allocation algorithm for wireless networks is provided. The time slot and channel allocation includes a distributed allocation phase and an allocation adjustment phase. Each phase begins allocation at a first node and continues node-by-node until the last node in the network. The allocation then reflects back from the last node to the first node. At each node in the path, the node can initiate resource allocation between itself and its neighbor nodes. Nodes that are within range of the wireless network but are not on the path do not initiate resource allocation but instead participate in the resource allocation initiated from other nodes.

37 Claims, 10 Drawing Sheets

The detailed mechanism of WAVE-DTCA

U.S. PATENT DOCUMENTS

| | | |
|---|---|---|
| 6,199,115 B1 | 3/2001 | DiRienzo |
| 6,208,629 B1 | 3/2001 | Jaszewski et al. |
| 6,226,642 B1 | 5/2001 | Beranek et al. |
| 6,226,684 B1 | 5/2001 | Sung et al. |
| 6,236,662 B1 | 5/2001 | Reilly |
| 6,272,492 B1 | 8/2001 | Kay |
| 6,282,513 B1 | 8/2001 | Strawder |
| 6,289,316 B1 | 9/2001 | Aghili et al. |
| 6,292,596 B1 | 9/2001 | Snyder et al. |
| 6,330,244 B1 | 12/2001 | Swartz et al. |
| 6,331,762 B1 | 12/2001 | Bertness |
| 6,336,114 B1 | 1/2002 | Garrison |
| 6,338,093 B1 | 1/2002 | DiRienzo |
| 6,343,310 B1 | 1/2002 | DiRienzo |
| 6,345,260 B1 | 2/2002 | Cummings, Jr. et al. |
| 6,349,334 B1 | 2/2002 | Faupel et al. |
| 6,356,992 B1 | 3/2002 | Baxter et al. |
| 6,357,010 B1 | 3/2002 | Viets et al. |
| 6,366,683 B1 | 4/2002 | Langlotz |
| 6,366,912 B1 | 4/2002 | Wallent et al. |
| 6,366,929 B1 | 4/2002 | Dartigues et al. |
| 6,385,730 B2 | 5/2002 | Garrison |
| 6,414,955 B1 | 7/2002 | Clare et al. |
| 6,418,549 B1 | 7/2002 | Ramchandran et al. |
| 6,434,191 B1 | 8/2002 | Agrawal et al. |
| 6,460,128 B1 | 10/2002 | Baxter et al. |
| 6,480,497 B1 | 11/2002 | Flammer, III et al. |
| 6,526,534 B1 | 2/2003 | Nagoya |
| 6,625,605 B1 | 9/2003 | Terakura et al. |
| 6,628,636 B1 | 9/2003 | Young |
| 6,640,087 B2 | 10/2003 | Reed et al. |
| 6,665,311 B2 | 12/2003 | Kondylis et al. |
| 6,671,840 B1 | 12/2003 | Nagoya et al. |
| 6,687,259 B2 | 2/2004 | Alapuranen |
| 6,694,313 B1 | 2/2004 | Roemer |
| 6,704,321 B1 | 3/2004 | Kamiya |
| 6,754,188 B1 | 6/2004 | Garahi et al. |
| 6,754,499 B1 * | 6/2004 | Smith ............ 455/450 |
| 6,760,877 B1 | 7/2004 | Lappetelainen et al. |
| 6,763,007 B1 | 7/2004 | La Porta |
| 6,763,013 B2 | 7/2004 | Kennedy |
| 6,788,702 B1 | 9/2004 | Garcia-Luna-Aceves et al. |
| 6,791,949 B1 | 9/2004 | Ryu et al. |
| 6,795,418 B2 | 9/2004 | Choi |
| 6,807,165 B2 | 10/2004 | Belcea |
| 6,839,541 B2 | 1/2005 | Alzoubi et al. |
| 6,845,084 B2 | 1/2005 | Rangnekar et al. |
| 6,850,502 B1 | 2/2005 | Kagan et al. |
| 6,850,511 B2 | 2/2005 | Kats et al. |
| 6,853,641 B2 | 2/2005 | Lindhorst-Ko et al. |
| 6,865,371 B2 | 3/2005 | Salonidis et al. |
| 6,868,072 B1 | 3/2005 | Lin et al. |
| 6,870,846 B2 | 3/2005 | Cain |
| 6,879,570 B1 | 4/2005 | Choi |
| 6,894,985 B2 | 5/2005 | Billhartz |
| 6,904,021 B2 | 6/2005 | Belcea |
| 6,907,257 B1 | 6/2005 | Mizutani et al. |
| 6,909,721 B2 | 6/2005 | Ekberg et al. |
| 6,912,215 B1 | 6/2005 | Lin et al. |
| 6,948,048 B2 | 9/2005 | Baxter et al. |
| 6,950,418 B1 | 9/2005 | Young et al. |
| 6,961,310 B2 | 11/2005 | Cain |
| 6,965,575 B2 | 11/2005 | Srikrishna et al. |
| 6,970,714 B2 | 11/2005 | D'Souza et al. |
| 6,975,613 B1 | 12/2005 | Johansson |
| 6,975,614 B2 | 12/2005 | Kennedy |
| 6,980,524 B1 | 12/2005 | Lu et al. |
| 6,985,476 B1 | 1/2006 | Elliott et al. |
| 6,986,161 B2 | 1/2006 | Billhartz |
| 6,990,092 B1 | 1/2006 | Siala |
| 6,993,358 B2 | 1/2006 | Shiotsu et al. |
| 7,002,944 B2 | 2/2006 | Kats et al. |
| 7,003,313 B2 | 2/2006 | Garces et al. |
| 7,007,102 B2 | 2/2006 | Billhartz et al. |
| 7,016,328 B2 | 3/2006 | Chari et al. |
| 7,027,426 B2 | 4/2006 | Billhartz |
| 7,031,293 B1 | 4/2006 | Srikrishna et al. |
| 7,035,207 B2 | 4/2006 | Winter et al. |
| 7,046,639 B2 | 5/2006 | Garcia-Luna-Aceves et al. |
| 7,046,649 B2 | 5/2006 | Awater et al. |
| 7,047,473 B2 | 5/2006 | Hwang et al. |
| 7,050,806 B2 | 5/2006 | Garces et al. |
| 7,050,819 B2 | 5/2006 | Schwengler et al. |
| 7,053,770 B2 | 5/2006 | Ratiu et al. |
| 7,054,126 B2 | 5/2006 | Strutt et al. |
| 7,058,021 B2 | 6/2006 | Srikrishna et al. |
| 7,061,895 B1 | 6/2006 | Habetha |
| 7,062,286 B2 | 6/2006 | Grivas et al. |
| 7,069,483 B2 * | 6/2006 | Gillies et al. ............ 714/712 |
| 7,075,414 B2 | 7/2006 | Giannini et al. |
| 7,082,111 B2 | 7/2006 | Amouris |
| 7,082,115 B2 | 7/2006 | Bauer et al. |
| 7,089,066 B2 | 8/2006 | Hesse et al. |
| 7,091,852 B2 | 8/2006 | Mason et al. |
| 7,095,732 B1 | 8/2006 | Watson, Jr. |
| 7,116,983 B2 | 10/2006 | Lan et al. |
| 7,139,336 B2 | 11/2006 | Nefedov |
| 7,151,777 B2 | 12/2006 | Sawey |
| 7,233,584 B2 | 6/2007 | Nguyen et al. |
| 7,245,947 B2 | 7/2007 | Salokannel et al. |
| 7,251,224 B2 | 7/2007 | Ades et al. |
| 7,269,198 B1 | 9/2007 | Elliott et al. |
| 7,280,555 B2 | 10/2007 | Stanforth et al. |
| 7,301,958 B2 | 11/2007 | Borkowski et al. |
| 7,324,824 B2 | 1/2008 | Smith et al. |
| 7,376,099 B2 | 5/2008 | Tseng et al. |
| 7,379,447 B2 | 5/2008 | Dunagan et al. |
| 7,388,849 B2 | 6/2008 | Kim et al. |
| 7,395,073 B2 | 7/2008 | Gwon et al. |
| 7,418,523 B2 | 8/2008 | Pettyjohn et al. |
| 7,428,523 B2 | 9/2008 | Tsang et al. |
| 7,451,365 B2 * | 11/2008 | Wang et al. ............ 714/712 |
| 7,496,059 B2 * | 2/2009 | Yoon ............................ 370/311 |
| 7,512,074 B2 | 3/2009 | Strutt et al. |
| 7,522,537 B2 | 4/2009 | Joshi |
| 7,609,641 B2 | 10/2009 | Strutt et al. |
| 7,688,808 B2 | 3/2010 | Ren |
| 7,701,858 B2 | 4/2010 | Werb et al. |
| 2003/0126291 A1 | 7/2003 | Wang et al. |
| 2003/0142624 A1 | 7/2003 | Chiussi et al. |
| 2003/0157951 A1 | 8/2003 | Hasty |
| 2003/0161268 A1 | 8/2003 | Larsson et al. |
| 2003/0179742 A1 | 9/2003 | Ogier et al. |
| 2003/0193908 A1 | 10/2003 | Cain |
| 2003/0212821 A1 | 11/2003 | Gillies |
| 2003/0212941 A1 | 11/2003 | Gillies |
| 2003/0224787 A1 | 12/2003 | Gandolfo |
| 2004/0109428 A1 | 6/2004 | Krishnamurthy |
| 2004/0147223 A1 | 7/2004 | Cho |
| 2004/0152416 A1 | 8/2004 | Dahl |
| 2004/0198375 A1 | 10/2004 | Schwengler et al. |
| 2004/0229566 A1 | 11/2004 | Wang et al. |
| 2005/0002366 A1 | 1/2005 | Toskala et al. |
| 2005/0026621 A1 | 2/2005 | Febvre et al. |
| 2005/0083971 A1 | 4/2005 | Delaney et al. |
| 2005/0090266 A1 | 4/2005 | Sheynblat |
| 2005/0111475 A1 | 5/2005 | Borkowski et al. |
| 2005/0141453 A1 | 6/2005 | Zhu |
| 2005/0190770 A1 | 9/2005 | Saniee et al. |
| 2005/0201315 A1 | 9/2005 | Lakkis |
| 2005/0201340 A1 | 9/2005 | Wang et al. |
| 2005/0201346 A1 | 9/2005 | Wang et al. |
| 2005/0221752 A1 | 10/2005 | Jamieson et al. |
| 2005/0232179 A1 | 10/2005 | daCosta et al. |
| 2006/0104292 A1 | 5/2006 | Gupta et al. |
| 2006/0128402 A1 | 6/2006 | Lee et al. |
| 2006/0182142 A1 | 8/2006 | Schmidt |
| 2006/0198339 A1 | 9/2006 | Marinier et al. |
| 2006/0215583 A1 | 9/2006 | Castagnoli |
| 2006/0215593 A1 * | 9/2006 | Wang et al. ............ 370/315 |
| 2006/0240843 A1 | 10/2006 | Spain et al. |
| 2006/0268908 A1 | 11/2006 | Wang et al. |
| 2007/0049342 A1 | 3/2007 | Mayer et al. |
| 2007/0076673 A1 | 4/2007 | Joshi |
| 2007/0076697 A1 | 4/2007 | Huotari et al. |
| 2007/0104215 A1 | 5/2007 | Wang |
| 2007/0110102 A1 * | 5/2007 | Yagyuu et al. ............ 370/470 |

| | | | |
|---|---|---|---|
| 2007/0159991 | A1 | 7/2007 | Noonan et al. |
| 2007/0201421 | A1 | 8/2007 | Huseth |
| 2007/0211682 | A1 | 9/2007 | Kim et al. |
| 2007/0247367 | A1 | 10/2007 | Anjum et al. |
| 2007/0247368 | A1 | 10/2007 | Wu |
| 2007/0258508 | A1 | 11/2007 | Werb et al. |
| 2007/0294226 | A1 | 12/2007 | Chahal et al. |
| 2008/0031169 | A1 | 2/2008 | Shi |
| 2008/0032705 | A1 | 2/2008 | Patel |
| 2008/0037723 | A1 | 2/2008 | Milstein et al. |
| 2008/0069071 | A1 | 3/2008 | Tang |
| 2008/0080378 | A1 | 4/2008 | Kim et al. |
| 2008/0137620 | A1 | 6/2008 | Wang et al. |
| 2008/0192713 | A1 | 8/2008 | Mighani et al. |
| 2008/0259895 | A1 | 10/2008 | Habetha et al. |
| 2009/0073924 | A1 | 3/2009 | Chou |

FOREIGN PATENT DOCUMENTS

| | | |
|---|---|---|
| WO | 2004/104850 | 12/2004 |
| WO | 2007/143554 | 12/2007 |
| WO | 2008/070871 | 6/2008 |

OTHER PUBLICATIONS

Written Opinion for for PCT/US07/69031 mailed May 13, 2008.

Bao et al., "Collision-Free Topology-Dependent Channel Access Scheduling," Oct. 22-25, 2000, MILCOM 2000. 21st Century Military Communication Conference Proceedings, vol. 1, pp. 507-511.

Bao et al., "Distributed dynamic access scheduling for ad hoc networks," Journal of Parallel and Distributed Computing, Apr. 13, 2003, Elsevier Science, vol. 63, Issue 1, pp. 3-14.

Tang et al., "Interference-Aware Topology Control and QoS Routing in Multi-Channel Wireless Mesh Networks, 2005, International Symposium on mobile Ad Hoc Networking and Computing," Proceedings of the 6th ACM International Symposium on Mobile ad hoc networking and computing, pp. 68-77.

Tang et al., "Hop Reservation Multiple Access (HRMA) for Multichannel Packet Radio Networks," IEEE Computer Communications Networks, 1998 Proceedings, 7th International Conference, p. 388-395, Oct. 12-15, 1998.

Tang et al., "A Protocol for Topology-Dependent Transmission Scheduling in Wireless Networks," IEEE Wireless Communication and Networking Conference 1999 (WCNC '99), p. 1333-1337 Sep. 1999.

Mishra, Arunesh et al., "Weighted Coloring based Channel Assignment for WLANs," Mobile Computing and Communications Review, 9(3):19-31 (2005).

Alicherry, Mansoor et al., "Joint Channel Assignment and Routing for Throughput Optimization in Multi-radio Wireless Mesh Networks," MobiHoc'05, pp. 58-72 (Aug. 28-Sep. 2, 2005).

Bahl, Paramvir et al., "SSCH: Slotted Seeded Channel Hopping for Capacity Improvement in IEEE 802.11 Ad-Hoc Wireless Networks," MobiCom'04, pp. 216-230 (Sep. 26-Oct. 1, 2004).

So, Jungmin et al., "Multi-Channel MAC for Ad Hoc Networks: Handling Multi-Channel Hidden Terminals Using a Single Transceiver," MobiHoc'04, pp. 222-233 (May 24-26, 2004).

Raniwala, Ashish et al., "Centralized Channel Assignment and Routing Algorithms for Multi-Channel Wireless Mesh Networks," Mobile Computing and Communications Review, 8(2):50-65 (2004).

Raniwala, Ashish et al., "Architecture and Algorithms for an IEEE 802.11-Based Multi-Channel Wireless Mesh Network," IEEE, 2223-2234 (2005).

Raman, Bhaskaran, "Channel Allocation in 802.11-based Mesh Networks," Proceedings IEEE Infocom, pp. 1-10 (2006).

Ramachandran, Krishna N. et al., "Intereference-Aware Channel Assignment in Multi-Radio Wireless Mesh Networks," Proceedings IEEE Infocom, pp. 1-12 (Apr. 2006).

Kodialam, Murali et al., "Characterizing Achievable Rates in Multi-Hop Wireless Mesh Networks With Orthogonal Channels," IEEE/ACM Transactions on Networking, 13(4):868-880 (Aug. 2005).

Kodialam, Murali et al., "Characterizing the Capacity Region in Multi-Radio Multi-Channel Wireless Mesh Networks," MobiCom'05, pp. 73-87 (Aug. 28-Sep. 2, 2005).

International Search Report, PCT Pat. App. No. PCT/US2007/086887, mailed May 22, 2008.

International Preliminary Report on Patentability and Written Opinion of the International Search Authority, PCT Pat. App. No. PCT/US2007/086887, mailed May 22, 2008.

* cited by examiner

Figure 1: An example of chain reaction in resource allocation

| Link | Time Slot | Channel |
|---|---|---|
| A—B | 1 | 1 |
| B—C | 2 | 1 |
| C—E | 1 | 2 |
| E—F | 2 | 2 |
| F—G | 1 | 1 |

| Link | Time Slot | Channel |
|---|---|---|
| A—B | 1, 3 | 1, 2 |
| B—C | 2 | 1 |
| C—D | 3 | 1 |
| C—E | 1 | 2 |
| E—F | 2 | 2 |
| F—G | 1, 3 | 1, 2 |

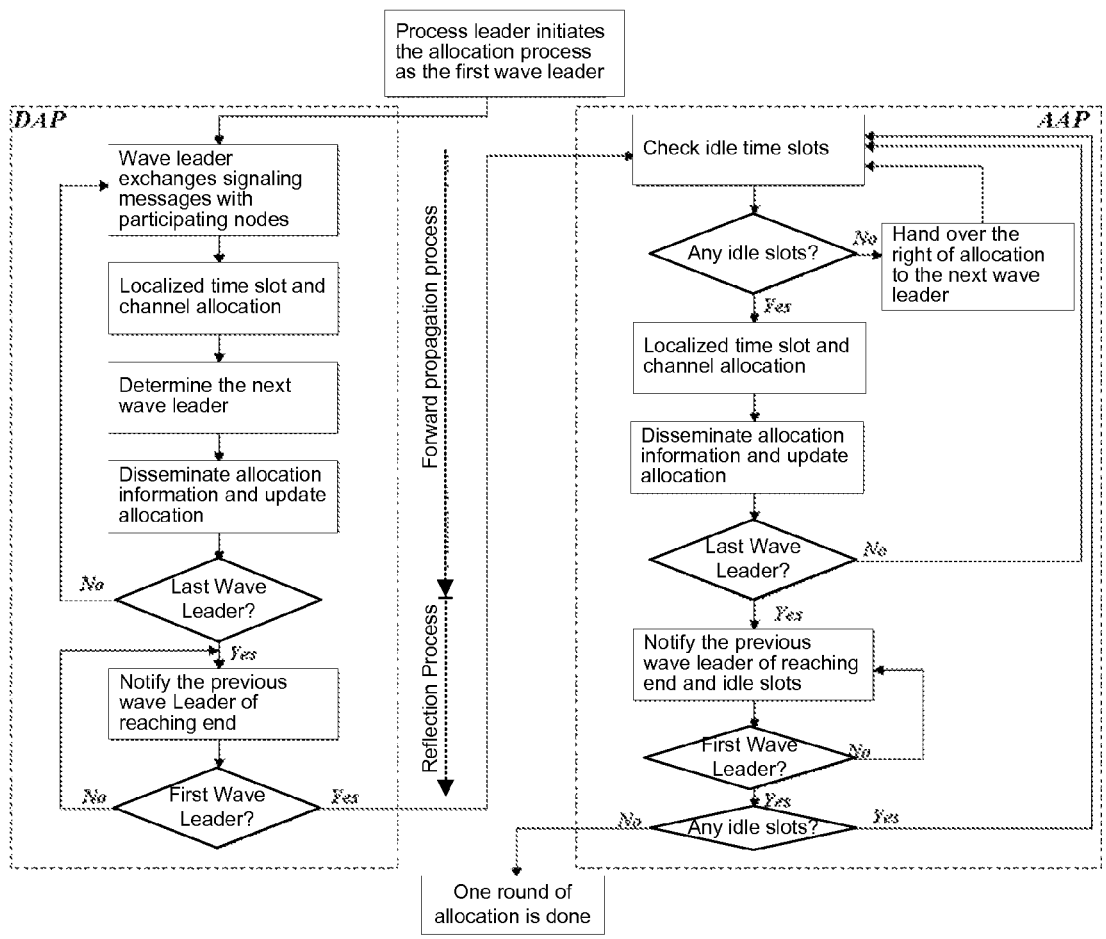
Figure 3: The detailed mechanism of WAVE-DTCA
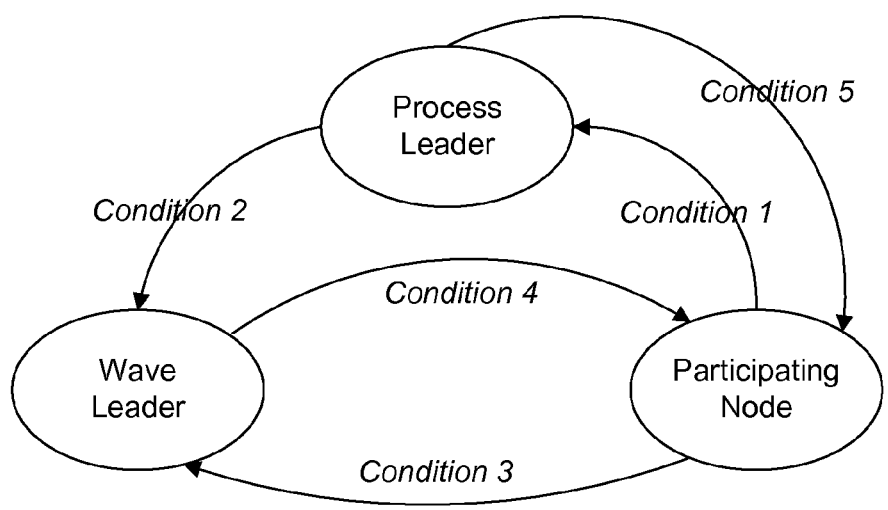
Figure 4: Node type transitions

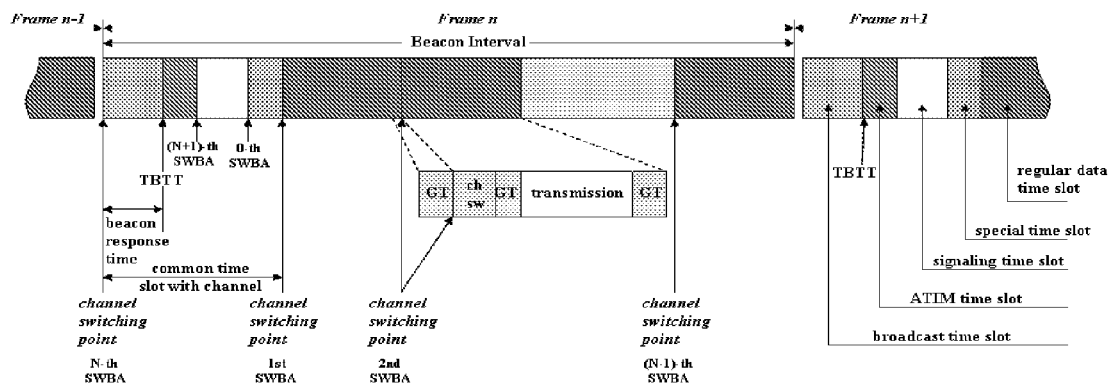
Figure 5: The TDMA frame structure for WAVE-DTCA
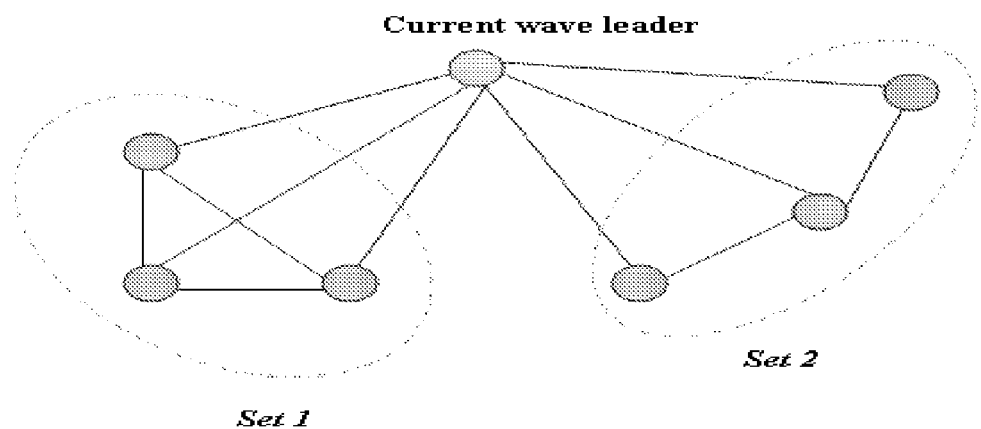
Figure 6: Two independent sets of neighbors of the current wave leader

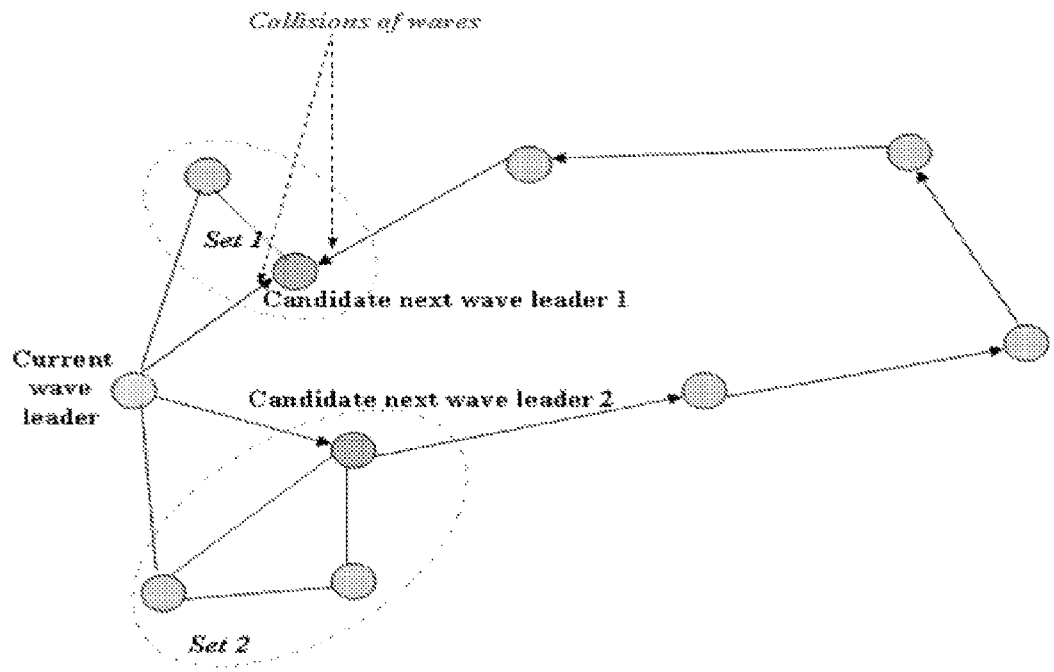
Figure 7: The loop of waves when multiple candidate wave leaders exist
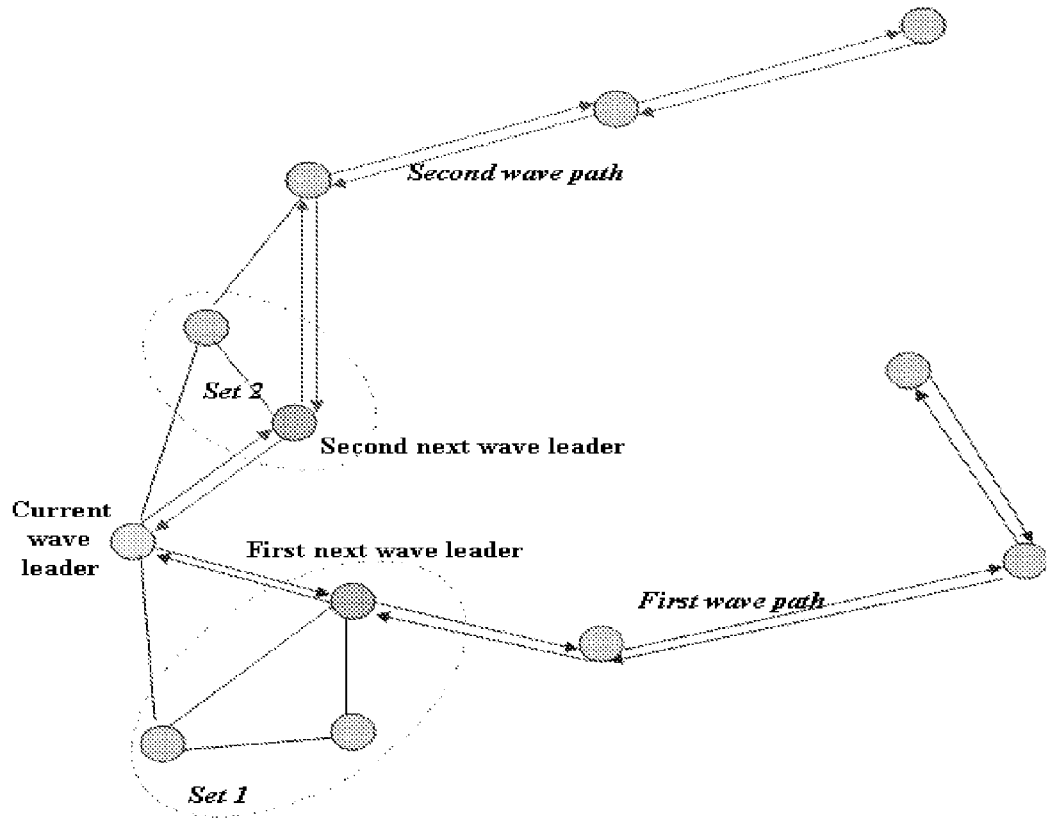
Figure 8 (a): Solution to multiple candidate wave leaders (scenario 1)

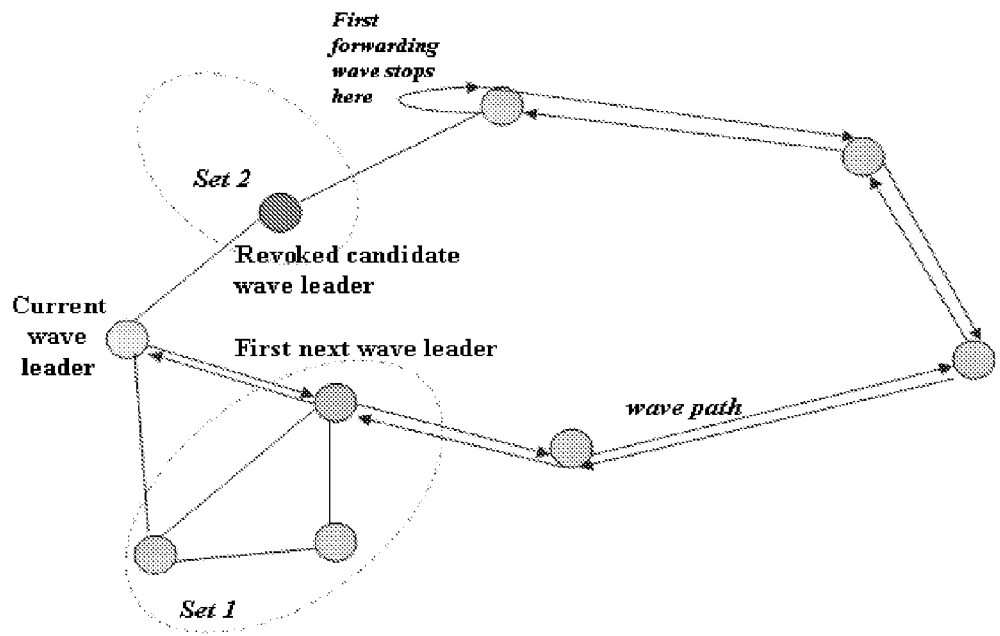
Figure 8 (b): Solution to multiple candidate wave leaders (scenario 2)
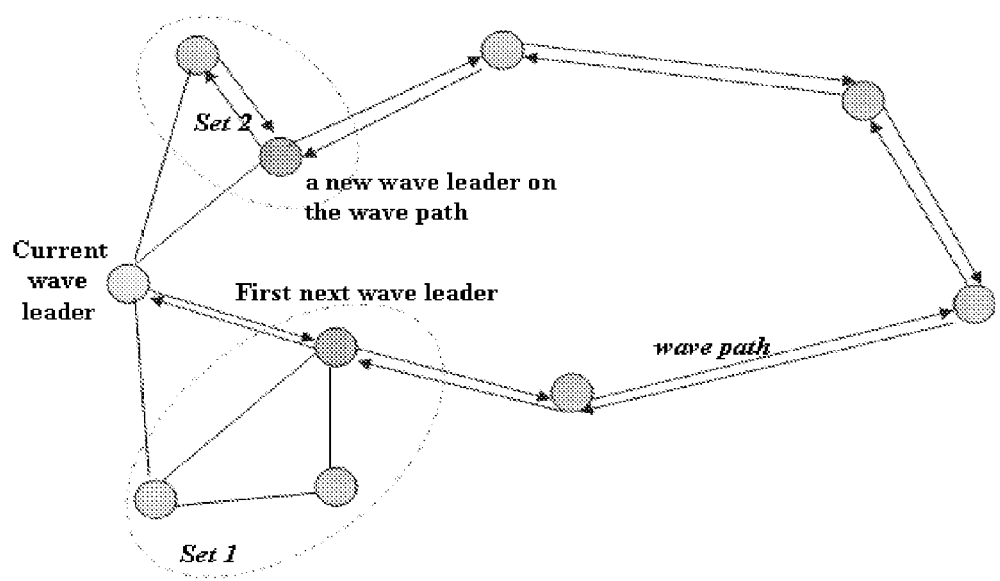
Figure 8 (c): Solution to multiple candidate wave leaders (scenario 3)

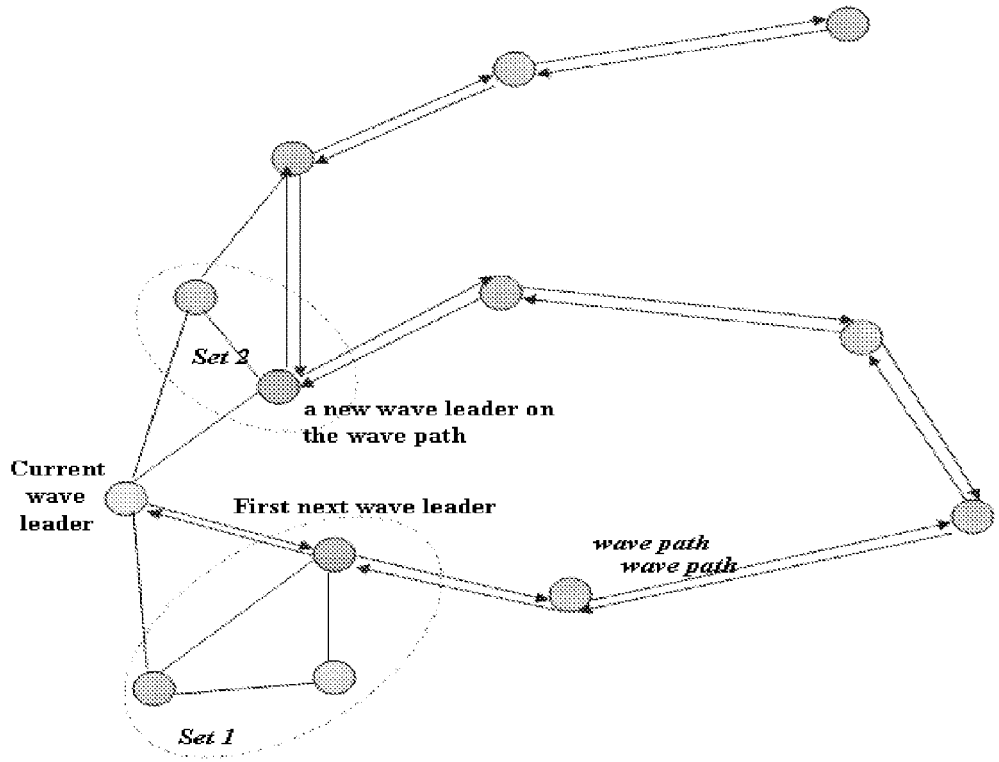
Figure 8 (d): Solution to multiple candidate wave leaders (scenario 4)
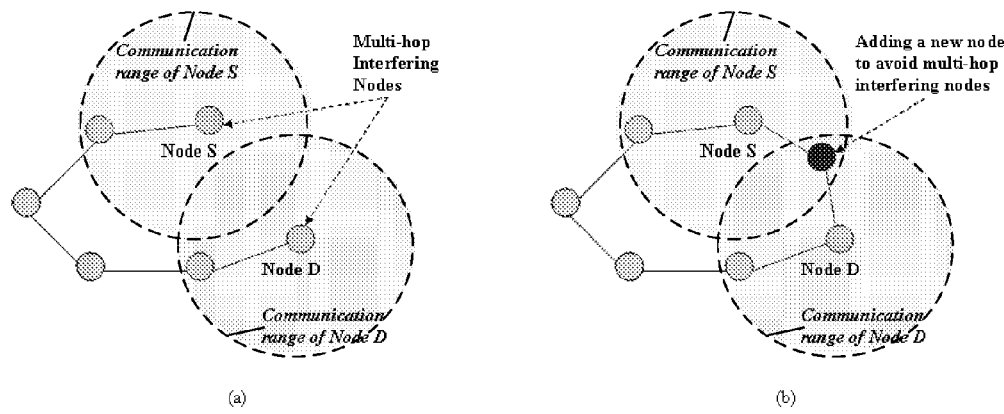
Figure 9: Multi-hop interfering nodes

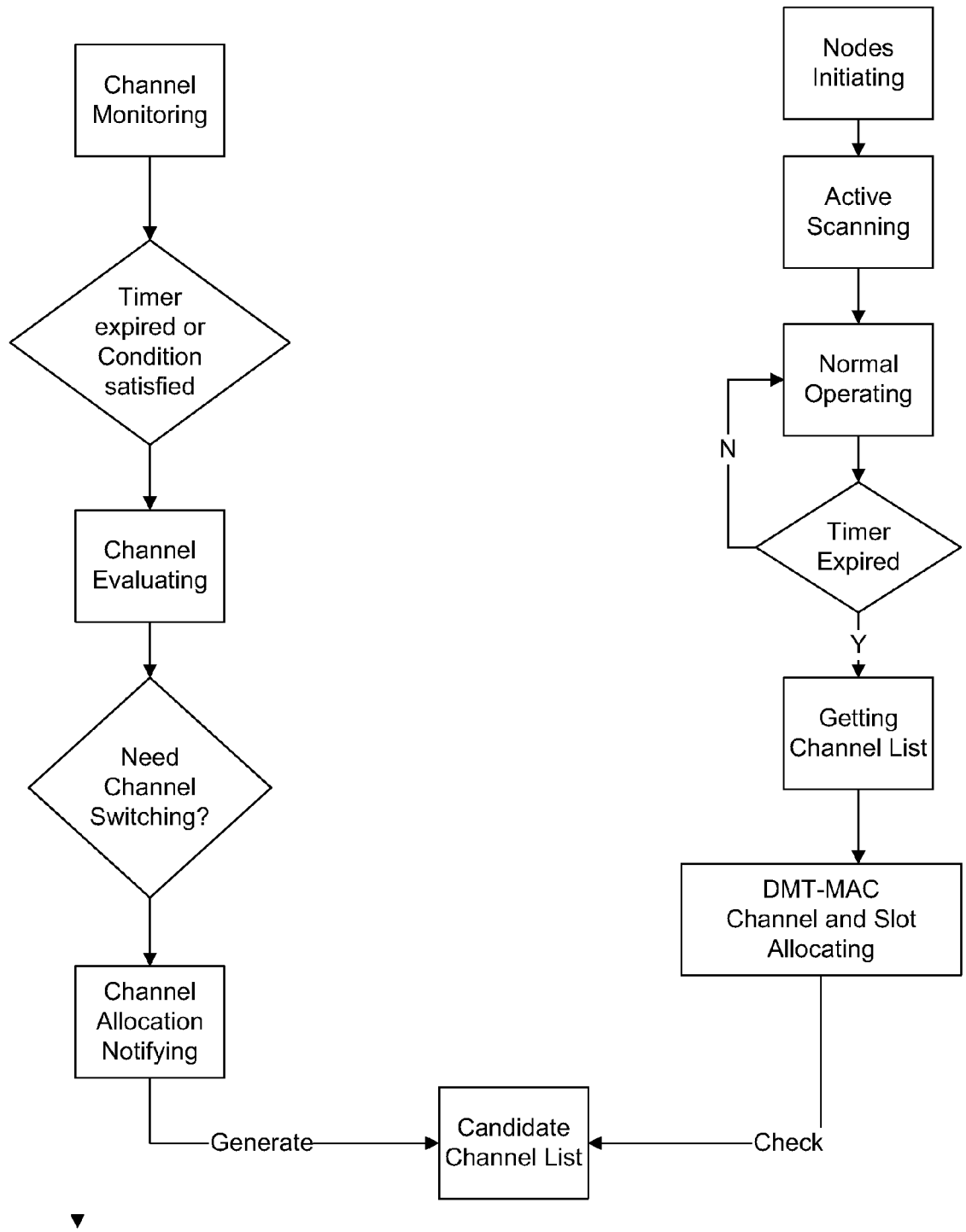
Figure 10: The basic flow chart of dynamic channel allocation

| Message Name | Message-ID | Functionality |
|---|---|---|
| DAP | | |
| MACSIG_HANDOVER_PROCESSLEADER | 0 | Transfer the right of being the process leader to another node |
| MACSIG_REQUEST_NEIGHBOR | 1 | Request neighbor information from a node |
| MACSIG_REPLY_REQUEST | 2 | Send neighbor information to the requesting node |
| MACSIG_NOTIFY_ALLOCATION | 3 | Notify allocation information to a neighbor node |
| MACSIG_START_NEXTDAPWAVE | 4 | Notify the next wave leader to propagate DAP wave |
| MACSIG_REVOKE_CANDIDATE | 5 | A candidate wave leader is revoked |
| MACSIG_FINISH_DAP | 6 | DAP process is being finished |
| AAP | | |
| MACSIG_REQUEST_NEIGHBOR_AAP | 7 | Request neighbor information from a node in AAP |
| MACSIG_REPLY_REQUEST_AAP | 8 | Send neighbor information to the requesting node in AAP |
| MACSIG_NOTIFY_ADJUSTMENT | 9 | Notify adjusted allocation information to a neighbor node |
| MACSIG_START_NEXTAAPWAVE | 10 | Notify the next wave leader to propagate AAP wave |
| MACSIG_HANDOVER_AAP | 11 | Transfer the right of being the wave leader to the next node in AAP |
| MACSIG_FINISH_AAP | 12 | AAP is being finished |

FIG. 11

|  | Channel 36 | | Channel 44 | | Channel 48 | | Channel 64 | |
|---|---|---|---|---|---|---|---|---|
| self | Retransmission rate | 10% | Retransmission rate | 20% | Retransmission rate | No record | Retransmission rate | Expired |
|  | Packet corrupted rate | 15% | Packet corrupted rate | 10% | Packet corrupted rate | No record | Packet corrupted rate | Expired |
|  | Record period | 10 min | Record period | 10 min | Record period | No record | Record period | Expired |
|  | Record end time | In use | Record end time | 30 min ago | Record end time | No record | Record end time | Expired |
| Neighbor 1 | Retransmission rate | 20% | Retransmission rate | 20% | Retransmission rate | 15% | Retransmission rate | No record |
|  | Packet corrupted rate | 15% | Packet corrupted rate | 10% | Packet corrupted rate | 5% | Packet corrupted rate | No record |
|  | Record period | 10 min | Record period | 10 min | Record period | 10 min | Record period | No record |
|  | Record end time | In use | Record end time | 10 min ago | Record end time | In use | Record end time | No record |
| Neighbor 2 | Retransmission rate | Expired | Retransmission rate | 10% | Retransmission rate | 20% | Retransmission rate | No record |
|  | Packet corrupted rate | Expired | Packet corrupted rate | 15% | Packet corrupted rate | 5% | Packet corrupted rate | No record |
|  | Record period | Expired | Record period | 10 min | Record period | 10 min | Record period | No record |
|  | Record end time | Expired | Record end time | In use | Record end time | 20 min ago | Record end time | No record |

FIG. 12

SYSTEM AND METHOD FOR TIMESLOT AND CHANNEL ALLOCATION

RELATED APPLICATIONS

The present application claims priority to U.S. provisional patent application Ser. No. 60/869,002 filed on Dec. 7, 2006, which is incorporated herein by reference in its entirety.

BACKGROUND

1. Field of the Invention

The present invention is generally related to wireless communications and more specifically related to a media access control ("MAC") layer module implementation of a distributed multichannel time division multiple access ("TDMA") communication scheme and the dynamic allocation of timeslots and channels.

2. Related Art

Conventional wireless communications suffer from a lack of scalability and an inability to deliver the quality of service ("QoS") level demanded by high bandwidth applications and sophisticated consumers. What is needed is a system and method that overcomes these significant problems found in the conventional systems as described above.

SUMMARY

Described herein is a distributed multi-channel TDMA MAC ("DMT-MAC") solution that is oriented for wireless networks with single-transceiver nodes. The present disclosure provides a novel time slot and channel allocation algorithm, called wave-propagation based distributed time slot and channel allocation ("WAVE-DTCA"). WAVE-DTCA comprises two phases: (1) distributed allocation phase ("DAP"); and (2) allocation adjustment phase ("AAP"). Both phases work like wave propagation, e.g., allocation starts at a first node and continues node-by-node until the last node in the network and then the process reflects back from the last node to the first node.

The wave-propagation path comprises nodes, each of which can initiate resource allocation between itself and its neighbor nodes. Nodes that do not reside on this path do not initiate resource allocation but instead participate in the resource allocation initiated from other nodes.

In DAP, time slots and channels are allocated node-by-node as the wave-propagation path is set up. When the wave reaches the last node, it is reflected by traversing the wave-propagation path back to the first node. Once the wave returns to the first node, DAP is complete and AAP starts. In AAP, remaining time slots and appropriate channels are assigned to nodes one-by-one along the wave-propagation path. Once the AAP wave reaches the last node, it returns to the initial node along the wave-propagation path. After all time slots have been allocated in the entire network, the whole process of time slot and channel allocation is accomplished. Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1 is a network diagram illustrating two example wireless communication networks and the various communication links between the nodes of each network according to an embodiment of the present invention;

FIG. 3 is a flow diagram illustrating an example process for timeslot and channel allocation in a wireless network according to an embodiment of the present invention;

FIG. 4 is a state diagram illustrating example states for nodes in a wireless network during timeslot and channel allocation according to an embodiment of the present invention;

FIG. 5 is a block diagram illustrating an example TDMA frame structure for WAVE-DTCA according to an embodiment of the present invention;

FIG. 6 is a network diagram illustrating independent sets of neighboring nodes in a wireless network with the current wave leader according to an embodiment of the present invention;

FIG. 7 is a network diagram illustrating independent sets of neighboring nodes in a wireless network with more than one candidate for next wave leader according to an embodiment of the present invention;

FIGS. 8A-8D are network diagrams illustrating alternative strategies for resolving multiple next wave leaders according to embodiments of the present invention;

FIG. 9 is a network diagram illustrating multi-hop interfering nodes according to an embodiment of the present invention;

FIG. 10 is a flow diagram illustrating an example process for dynamic channel allocation according to an embodiment of the present invention;

FIG. 11 is a block diagram illustrating an example table listing of the signaling messages used in WAVE-DTCA according to an embodiment of the present invention;

FIG. 12 is a block diagram illustrating an example channel status table that includes local information and information from neighboring nodes according to an embodiment of the present invention;

DETAILED DESCRIPTION

Figures 2A, 2B:
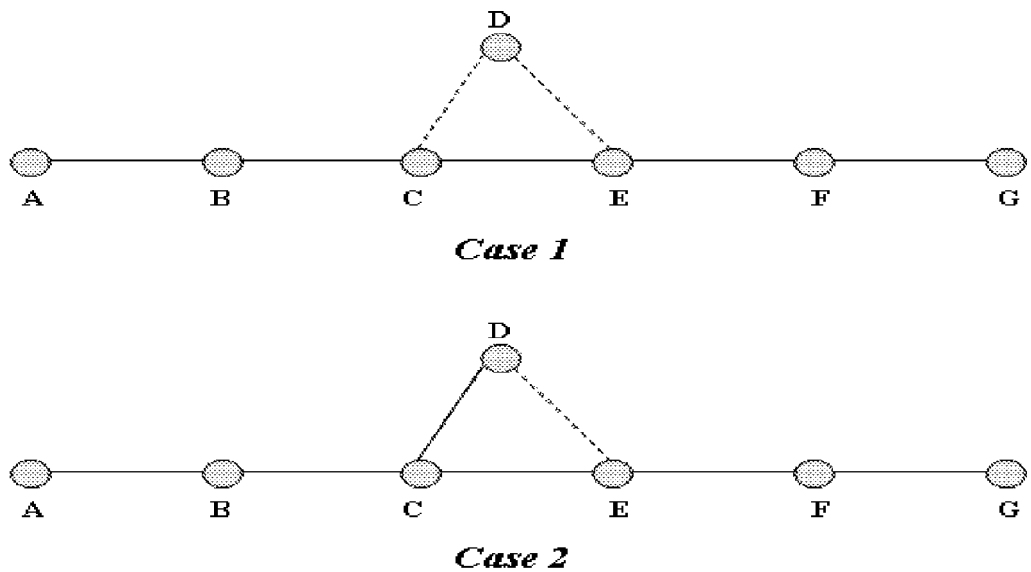
FIGS. 2A and 2B are block diagrams illustrating example timeslot and channel allocations for the networks shown in FIG. 1 according to an embodiment of the present invention.

Certain embodiments as disclosed herein provide for a DMT-MAC solution that is oriented for wireless networks. For example, one method as disclosed herein allows for time slot and channel allocation including a distributed allocation phase and an allocation adjustment phase that operate to allocate time slots and channels starting at a first node and continuing node-by-node until the last node in the network and then reflects back from the last node to the first node. This method works particularly well with single-transceiver nodes After reading this description it will become apparent to one skilled in the art how to implement the invention in various alternative embodiments and alternative applications. To facilitate a direct explanation of the invention, the present description will focus on embodiments where communication is carried out using traditional radio frequency ("RF") and ultra wideband ("UWB"), although the invention may be applied in alternative networks IEEE 802.11 802.15, 802.16, worldwide interoperability for microwave access ("WiMAX") network, wireless fidelity ("WiFi") network, wireless cellular network (e.g., wireless wide area network ("WAN"), ZigBee, and/or any other wireless communication network topology or protocol. Additionally, the described embodiment will also focus on a single radio embodiment although multi-radio embodiments and other multiple input multiple output ("MIMO") embodiments are certainly contemplated by the broad scope of the present invention. Therefore, it should be understood that the single radio embodiment described herein is presented by way of example only, and not limitation. As such, this detailed description should not be construed to limit the scope or breadth of the present invention as set forth in the appended claims.

INTRODUCTION

In a wireless mesh network (WMN), there are two critical issues: scalability and quality of service (QoS).

If a WMN does not have satisfactory performance in scalability, its performance, e.g., throughput, will drop quickly as the number of hops or nodes increase. In a mesh environment, scalability is actually rooted in the interference among nodes. Thus, whether or not a WMN has satisfactory scalability depends on how protocols, in particular a medium access control (MAC), are designed to effectively resolve interference among nodes. In an IEEE 802.11 base WMN, the carrier sense multiple access (CSMA) with collision avoidance (CA) protocol ensure correct transmission by employing carrier sense, backoff procedure, and optional RTS/CTS. This protocol can avoid interference among transmissions of different nodes, but it is too ineffective to resolve the scalability issue. In fact, many research results have showed that IEEE 802.11 WMN has very poor performance in scalability. Many industrial practices also demonstrated that the performance of an IEEE 802.11 WMN degrades as the network size increases. It is widely accepted that the hidden node issue and the exposed node issue are two major reasons for the low performance if IEEE 802.11 WMNs. However, the actual reason behind either the hidden node issue or the exposed node issue is the mechanism of avoiding interference among nodes is not effective, which thus cause several problems: hidden nodes, exposed node, and slow process of collision resolution.

To develop a scheme that can truly effectively avoid interference among nodes, two approaches are integrated: (1) Distributed time division multiple access (TDMA): Transmissions of all nodes are carried out in time slots that are determined by a distributed scheduling scheme. Nodes with the same interference range use different time slots. Since no central controller is available in a WMN environment, the challenge of distributed TDMA is the development of a distributed time slot allocation algorithm; (2) Multi-channel operation: The interference range is reduced into a smaller when multiple channels are used among different nodes. If only TDMA is used, the network throughput is still low because the interference range is much larger than the communication range. Although directional antenna can help to reduce the interference by using directional transmission, it also increases system complexity, demands fresh design of MAC and routing protocols, and causes more hidden nodes. Thus, multi-channel operation is preferred than directional antenna operation. On the other hand, with multi-channel operation enabled, directional antenna can be employed too when appropriate. The channel allocation of multi-channel operation in a WMN is a distributed channel allocation algorithm.

In order to integrate TDMA and multi-channel operation for WMNs, a distributed multi-channel TDMA (DMT) MAC protocol needs to be developed. In the DMT-MAC, there are two critical tasks: one is the overall system design of DMT-MAC based on commercially available chipsets without TDMA or multi-channel capability; the other is a distributed algorithm of determining time slots and channels for mesh nodes. The first task has been accomplished. In this document, we focus on the distributed time slot and allocation for DMT-MAC.

DMT-MAC ensures scalability for WMNs, it also makes QoS support become possible for applications with different QoS requirements. Without TDMA, there is no way for a node to reserve any resource, and thus QoS is not guaranteed. Even if IEEE 802.11e is applied, the same problem still exists. QoS related to time slot and channel allocation will be discussed later in this document.

Several challenging issues are resolved in a time slot and channel allocation algorithm for WMNs: (1) Conflict of allocation is avoided. Resource allocation for DMT-MAC involves two dimensions of resources: time slot and channel. In order to avoid conflict of resource allocation, the following constraint is satisfied: in the same time slot, nodes in the same interference range use different channels; (2) Network partition or loss of connectivity is allowed. Since nodes use different channels to avoid interference, channels are assigned properly in each time slot so that communications between any two nodes are always possible; otherwise, a WMN will be partitioned and connectivity between some nodes will be lost; (3) Allocation is distributive, since a centralized scheme has many disadvantages. Firstly, it is difficult to determine which node can be a central controller. Secondly, the central controller can be a bottleneck of the network. It needs to collect the information of the entire network in order to allocate time slots and channels for different nodes, which is rather inefficient in a WMN. Thirdly, a WMN based on a central controller is fragile to node failure. Whenever the central node is out of service, the entire network is down; (4) Allocation captures network dynamics due to variable traffic load, link activity, and topology. Otherwise, either network resource will not be utilized efficiently or some nodes cannot get fair allocation of resources; (5) Chain reaction of resource allocation is considered. Time slots and channels allocated to nodes need to be updated frequently due to network dynamics. However, update of allocation may cause a chain reaction, as explained in the following example. In FIG. 1, all nodes are assumed to have single radio with single transceiver. In addition, it is assumed that there always have traffic between Node A and Node G. Initially, i.e., case 1 in FIGS. 1, C-D and D-E have no traffic. Thus, the optimal time slot and channel allocation for all nodes is shown in FIG. 2A and the total number of time slots in each frame is 2. Now if C-D becomes active, i.e., case 2 in FIG. 1, the number of time slots in each frame becomes 3. Moreover, the allocation in Node C needs to be updated, and so does in Node E, which further needs update of allocation in Nodes F and B, and all the way to Nodes A and G. The updated allocation is shown in FIG. 2B. Comparing FIGS. 2A and 2B, we can easily find that allocation in all nodes are changed, which illustrates the chain reaction in resource allocation update. It should be noted that the allocation in case 2 is not unique, and thus FIG. 2B only shows one set of allocation results.

In FIG. 2B, it looks that the allocation in links B-C, C-E, and E-F have not been changed. However, all allocations in these links have been changed indeed, because the length of each time slot is changed.

When a single radio with single transceiver is considered, the above challenging issues become more apparent and severe. For example, nodes are easier to be partitioned into a different network if time slots and channels are not allocated properly. Since only one transceiver is available on each node, time slots are accurately allocated; otherwise, connectivity between nodes can be easily lost. Moreover, single transceiver requires fast channel switching.

WAVE-DTCA provides the following advantages (among others): (1) Distributed but coordinated solution: The proposed time slot and channel allocation algorithm is totally distributed. No master or header is needed in the algorithm. At the same time, the allocation is coordinated. Thus, allocation to different nodes does not cause conflict. Also, the allocation is convergent very fast, even with existence of network dynamics; (2) Non-interfering channel allocation: In conventional schemes, there is no guarantee that channels allocated to different nodes do not interfere with each other. In WAVE-DTCA, once allocation is done, channels in the entire network are non-conflict; and thus, as long as the available channels are enough, no interfering channel allocation exist; and (3) Adaptive to network dynamics: The allocation algorithm can always capture an active link and variable network topology. The different traffic load on each link can be captured too in the QoS extension of WAVE-DTCA. For the variable network topology, the mobility speed is required to be less than the convergence time of the WAVE-DTCA.

In order to resolve the challenging issues in time slot and channel allocation in a multi-channel WMN, a new distributed time slot and channel allocation (DTCA) algorithm is proposed. It works like wave-propagation, and thus is called, wave-propagation based DTCA (WAVE-DTCA).

In order to resolve the challenging issues mentioned above, a new time slot and channel allocation scheme is proposed. The basic ideas are summarized as follows: (1) In order to capture network dynamics due to topology change and variable traffic load, link activity detection is needed; (2) In order to have optimal allocation in response to the network dynamics, the allocation scheme dynamically updates resource (time slot/channel) allocation for all nodes. Since updating of resource allocation causes chain reaction, the dynamic update is not triggered on-demand. Instead, it is trigger periodically, and the frequency of updating resource allocation is a tunable system parameter; (3) Since no central controller is available, the resource allocation is performed in a distributed way. However, in WMNs the resource allocation of a node is cross-related to all other nodes within two hops. Thus, the localized allocation of time slots and channels are coordinated for the entire network; otherwise, conflict of allocation, i.e., collisions or interference between different traffic flows, will happen. Thus, the time slot and channel allocation needs to be a coordinated distributive scheme; (4) In order to ensure the time slot and channel allocation on each node be correct, this node collects allocation information of all 1-hop and 2-hop neighbors. Thus, a signaling protocol is needed to disseminate such information to other nodes, once a node has done its localized time slot and channel allocation. It should be noted that it is the coordinated distributed allocation process that avoids the possible conflict information of time slots and channels in different nodes; (5) Since the maintenance of the distributed resource allocation and dissemination of resource allocation information depend on a reliable delivery of signaling process, a reliable signaling method is needed.

Based on the basic ideas, a coordinated distributive allocation scheme is proposed. In order to distributively allocate time slots and channels for each node without causing any conflict of allocation, the process of localized time slot and channel allocation can only be initiated by one node for the entire network. Then, the process is handed over to the next node for the localized allocation. The process can only be split into multiple processes unless conditions are satisfied as elsewhere in this document. Once allocation process reaches the last node in the network, the last node will inform its parent node of this action, and this process is repeated until the node that initiated the allocation is reached. Then, the allocation is done. Thus, the entire process looks very similar to the wave propagation process. In this sense, the coordinated distributive allocation is called a wave-propagation based time slot and channel allocation (WAVE-DTCA) scheme.

In order to better explain the WAVE-DTCA scheme, several specific terms for WAVE-DTCA need to be defined.

First of all, the nodes in WMNs will be classified into three types: process leader, wave leader, and participating nodes. A process leader is a node that initiates the process of time slot and channel allocation for the entire WMN. Usually only one process leader is available in the network. Wave leader is a node that carries out the localized allocation of time slots and channels, and also hands over the allocation process to the next appropriate node. Thus, a wave leader also needs to determine the next wave leader so that the allocation process propagates like a wave. A process leader is the first wave leader in the allocation process. When the allocation process reaches the end node, wave leaders are also responsible for reflecting the process all the way back to the first wave leader, i.e., the process leader. A node that is neither a process leader not a wave leader is called a participating node, which means it is not involved in propagation of the allocation process, but it participates in the localized time slot and channel allocation.

The path comprising wave leaders is called a wave-propagation path, which tells how the allocation process traverses the entire network.

In WMNs, a node can have many neighbors. A node's neighbor is called a one-hop neighbor if the neighbor is in this node's transmission range, and the neighbor is called a two-hop neighbor if it is out of this node's transmission range but within the interference range.

WAVE-DTCA is operated periodically, and one round of allocation is shown in FIG. 3.

Thus, as we can see from FIG. 3, each round of allocation comprises two phases: dynamic allocation phase (DAP) and allocation adjustment phase (MP). The details of DAP and AAP, and the reason for having an AAP after DAP are explained elsewhere in this document.

As shown in FIG. 3, both DAP and AAP include two sequential processes: forward propagation process and reflection process.

In each round of allocation, only the process leader can start the allocation process. A node can change its type under certain conditions, as shown in FIG. 4.

A participating node is a process leader under condition 1, i.e., either the node is initialized as a process leader or an old process leader hands over its right of being process leader to this node. A process leader automatically becomes a wave leader under condition 2, i.e., a new round of allocation starts. A participating node becomes a wave leader under condition 3, i.e., it is selected to be a wave leader by its parent wave leader. A wave leader shall become a participating node when condition 4 is met, i.e., a round of allocation is done. Similarly, a process leader will become a participating node under condition 5, i.e., it hands over its right of being process leader to another node. Other transitions are not allowed in WAVE-DTCA.

In WAVE-DTCA, the process leader is not changed every round of allocation. Selecting a new process leader can be on-demand in response to the failure of the process leader or simply being replaced by another node after some rounds of allocations. In fact, the on-demand solution is preferred, but it is also more difficult to implement.

As shown in the operation procedures, WAVE-DTCA includes the following components: (1) Link activity detection: such information will be exchanged among different neighboring nodes; (2) Reliable delivery of MAC signaling: exchanging information of link activity, time slot and channel allocation and so on are sent in a reliable way in order to expedite signaling; (3) Localized allocation of time slots and channels: this can be different for DAP and AAP; (4) Determining wave leader: this only exists in DAP. Multiple wave leaders may be found; (5) Dissemination of allocation information: allocation information is reliably sent to neighbors, and neighbors update their allocation and determine what information should be disseminated according to a request; (6) Global allocation of time slots and channels: this is done through the entire process of DAP; (7) Adjustment of time slots and channels: This is done through the entire process of AAP.

All components or functions of WAVE-DTCA will be discussed in the next sections. Starting from the next sections, all the discussions will be based on the TDMA framework of the multi-channel MAC. For clarity, the frame structure is presented again, as shown in FIG. 5. The functionality of different types of time slots will be discussed in the following sections as they are used.

The DMT-MAC explicit signaling is adopted for reliable delivery of signaling messages for WAVE-DTCA. However, to support the operation of WAVE-DTCA, the following new functions need to be added: (a) Extended message types: messages with unique ID are needed to help the distributive allocation process. Contents vary with different message types; (b) Unicast based allocation information exchange: Information exchange is based on unicast transmission rather broadcast.

A reliable delivery scheme may be adopted. In brief, when a signaling message is to be sent in the signaling slot, it is transmitted by unicasting. No explicit acknowledgement is necessary, since the automatic acknowledgement in the hardware abstract layer (HAL) can be used to accomplish this task. Thus, after a message is sent, a node can just check HAL's ack status and find out if the message has been received successfully. In case the transmission fails and the current signaling slot has passed, all the signaling messages have to be held until the signaling slot in the next TDMA frame. Thus, whenever a new signaling slot starts, the queue of signaling messages is checked. If it is not empty, signaling based on unicasting is started.

In WAVE-DTCA, only one queue is used for all signaling messages, which makes the queue management of signaling much simpler. The reason that one queue is enough because the allocation process is totally coordinated so that only one node among all one-hop and two-hop neighbors sends signaling messages. This feature illustrates the advantage of WAVE-DTCA.

In order to avoid any hardware errors that can cause unreliable MAC signaling, MAC layer error control is also implemented for MAC signaling messages. This error control is done by two mechanisms: one is based on the verification of sequence number and packet length, the other is based on the verification of a special field designated to MAC signaling messages.

The signaling messages assisting the allocation process follows a generic format, as: Message-ID: Sequence Number: Contents.

Message-ID identifies the type of a message, and sequence number is used for eliminating duplicate messages in case the filtering of duplicate packets fails in the 802.11 driver. The length of contents is variable depends on the functionality of a message. However, the message-ID and sequence number have only 1 byte each. Thus, totally there are 256 signaling messages can be supported. The sequence number can be from 0 to 255, which is more than enough for signaling.

It should be noted that one signaling message is the data part of a regular MAC packet, and thus there is no need to specify new MAC layer packets for signaling messages.

The signaling messages used in WAVE-DTCA are listed in FIG. 11, but more messages can be extended as needed. The actual contents of each message depend on the functionality. In addition, for each type of message, its contents can also be extended as needed. It should also be noted that the message ID is a tunable parameter, although normally it is not necessary.

Link Activity Detection and Number of Time Slots

Link activity detection is used for finding out which link is active. The idle links and busy links are differentiated, since we do not want to allocate any resources to idle links.

Link activity is detected by considering two factors: protocol types and packet rate on each link. The packet rate is determined by the total number of packets within a certain period. The packets with certain port numbers are not considered when estimating the packet rate. For example, the management packets such as KMC and WARP are filtered out.

The response time of link activity detection can be fine tuned through two parameters: the period for collecting the interested packets and the threshold in terms of the number of packets in the given period.

Determining the number of time slots is one of the critical tasks in the WAVE-DTCA. The number of time slots cannot be fixed, since it captures the number of neighbor nodes in the network, how many active links, and so on. In addition, the number of time slots cannot be too small or too large. If it is too small, then the overhead of the TDMA system will render it inefficient. On the other hand, if it is too large, the round trip delay of any end to end communication will be too large to meet the requirement of transport protocol and QoS requirements of many applications.

In order to avoid above issues, the total number of time slots are controlled. In our design, given the current channel switching speed and the TDMA frame length, the total number of time slots are as close to 10 as possible; otherwise, the throughput in a multi-hop network will be much lower.

With the above requirement in mind, the WAVE-DTCA needs to find exactly how many time slots are needed in each link. There are two scenarios here: one is that the number of time slots allocated to links is determined solely based on active links; the other is the number of time slots allocated to links is determined based on both active links and the traffic load on this links. In this document, we focus on the former case.

For clarity of description, two type of time slots need to be defined. During DAP and AAP, the time slots allocated to each link are called temporary time slots, while the time slots actually allocated to each link after resource allocation is updated for all links are called final time slots. In our design, the number of final time slots are controlled to be as close to 10 as possible, and the number of temporary time slots is determined based on the algorithm.

Given a node in the network, it does not know how many temporary time slots that can be allocated unless it knows all active links of its neighbors including two-hop neighbors. On the other hand, even if all neighbor information is available, the number of temporary time slots to each node may not be shared in a fair way due to the limited number of time slots in our system. In order to avoid such a complexity, our time slot allocation is done gradually until all temporary time slots are used up.

Starting from the process leader, each node gets one temporary time slot for its active link. When it has done this process, it chooses a wave leader to continue this process. When the process reaches the end node, it returns to the process leader and finds out if idle time slots are available. This is the DAP process. If it is available, then AAP is started. Idle time slots are allocated to active links gradually in a fair way until no idle temporary time slots are available.

The total number of temporary time slots is determined by the maximum number of active links for each node. We call this metric the network degree. Such information on each node is propagated to the entire network, and if another node gets a large degree, it updates its own degree and further propagate this information. Thus, the network degree is equal to the maximum number of active links of a certain node in the whole network. The information propagation is done through implicit signaling via beacon transmission/reception.

During either DAP or AAP, it is possible that the node needs a time slot for a certain active link, but the total number of temporary time slots has been used up. In this case, the node needs to increase the number of temporary time slots and such information is propagated to all nodes in the network. In other words, the network degree is updated for the entire network.

For simplicity of description, time slots stand for temporary time slots.

There are several reasons for needing a two phase resource allocation: (1) The number of time slots (either temporary or final ones) is not known to each node. Even if the number of temporary time slots is available to each node as the network degree. This number needs to be updated since some nodes may not be able to get enough time slots. Thus, the allocation scheme cannot really rely on the total number of time slots to do allocation. The total number of time slots actually needs to be derived from the allocation algorithm. Without the total number of time slots, each node has to get a time slot for each link gradually until the temporary time slots are used up. In case no temporary time slots are available but some links still need time slots, the network degree or the maximum number of temporary time slots need to be updated for the entire network; (2) If time slots are allocated once, then all neighbor information is collected before allocation is performed on each node. This will make the algorithm inefficient and too complicated. Thus, in our design, we allocate time slots gradually to each link; in this way, the neighbor information is collected as the allocation process is propagated to different nodes. In DAP, time slots are allocated one by one to each link. In AAP, idle time slots are shared in idle time slots and in each round of AAP, it is not necessary to guarantee that all time slots need to be totally allocated, since number of time slots may not be equally shared by each link; (3) Since time slots are allocated to each link one by one in DAP, it may be possible that when DAP is over, some idle slots are still available. Thus, we need to have AAP phase, and the AAP phase may also contain several rounds, as explained above.

It should be noted that this same mechanism can be also applied to QoS extension of the WAVE-DTCA, i.e., different number of time slots can be allocated to each link using the same two-phase resource allocation scheme.

The flow chart of DAP is shown in FIG. 3.

A general procedure of DAP is described as follows: (1) Switch into multi-channel TDMA mode on the process leader and the process leader acts as the first wave leader; (2) The wave leader continues the DAP process by sending the macsig_request_neighbor message to neighbors one by one; (3) Each neighbor who gets such a request sends back a macsig_reply_request message, in which its own information and its neighbor information such as allocation tables are included; (4) The wave leader determines the time slot and channel for each link to each neighbor; (5) The wave leader determines the next wave leader and then sends information such as allocation tables to all neighbors one by one via macsig_notify_allocation message; (6) Once a neighbor gets such information, it updates its allocation tables; (7) The wave leader notifies the next wave leader by sending a macsig_start_nextdapwave; (8) The next wave leader will continue the wave propagation as in (2)-(7); (9) Once the last node in the network is reached, it will notify its parent wave leader by sending a macsig_dap_finish message. Such a message also needs to indicate if idle slots are still available as perceived by this node; (10) All wave leaders reflect the wave all the way to the first wave leader. When the first wave leader gets the macsig_dap_finish message, it will start the AAP.

In the above procedures, two more MAC signaling messages are not mentioned: macsig_handover_processleader and macsig_revoke_candidate. The former one is used by a process leader to tell one of its neighbors to act as a process leader. When this is should be done depends on the need of the mesh network. For example, if the wireless mesh network works fine with a fixed process leader, then handover of process leader is not needed. However, sometimes it is reasonable to change the process leader for the stability issue. In WAVE-DTCA, it is possible to have a dynamic process leader in the entire network. When there is no wave is detected within a certain number of allocation periods, a new process leader is selected.

macsig_revoke_candidate is used when the current wave leader finds that there are multiple paths that can propagate parallel waves. In this case, several nodes can be the next wave leader. If the waves are started at the same in all these nodes, there could have loop of waves, which is very common in mesh networks and can fail the WAVE-DTCA algorithm. In order to avoid this issue, only one node is selected as the next wave leader, and other nodes that have the potential to be the next wave leader are treated as candidate wave leaders. Whether they can really be a wave leader or not depends on if the loop of waves exist; if so, then such candidate wave leaders are revoked, which is notified via a macsig_revoke_candiate message.

In DAP, the most important algorithms include two parts: (1) how to allocate non-conflict time slots and channels to each link; (2) how to determine the next wave leader without a loop Localized Time Slot and Channel Allocation Time slot and channel allocation will be different for a process leader and a non process leader. However, for either case, only a node that is wave leader needs to do time slot and channel allocation; a participating node only helps a wave leader to collect network information so that the allocation can be done without any conflict.

Two rules are followed in the time slot and channel allocation algorithm: (1) Time slots allocated to different links that are two hops away are reused; (2) No conflict of channel allocation is allowed unless no non-overlapping channels is available.

A Wave Leader that is Also a Process Leader

For a process leader, the process can be simpler since no time slots and channels in the network have been allocated yet. Thus, the focus in this case is to properly allocate time slots to different links from the wave leader to the process leader's one hop neighbors. The same channel allocated to all links can be selected randomly from the set of non-overlapping channels. How the non-overlapping channels are formed is discussed elsewhere in this document.

The time slot can be simply allocated one by one to each link randomly. However, to given preference to links that have a smaller number of two-hop neighbors, the link with the smallest number of two-hop neighbors is allocated a time slot first. The reason for given such a preference to links with smaller two-hop neighbors is to provide better interleaving of time slots in a end-to-end path in a multi-hop network. In fact, the interleaving is provided by given preference. Thus, if we do the other way around, such as giving links with large number of two-hop neighbors a higher preference also works fine. The key is to give preference to links when allocate time slots rather than just randomly allocating time slots to links.

A Wave Leader that is not a Process Leader

For a non process leader, since time slots and channels have been assigned in some nodes in the network, one of the key tasks is to find time slots and channels for each link so that channels and time slots do not conflict. In order to achieve this goal, two-hop information are very critical to determine the time slots and channels. The two-hop information includes time slot and allocation information of the wave leader and one-hop and two-hop its neighbors. Such information is collected in several steps. The first step is that each node has stored its own time slot and channel allocation. If the node is a wave leader, all such information is easily available. For a non wave leader node, its own allocation information is sent from the wave leader, and its one-hop neighbor information is sent from different wave leaders and fused by itself. After each node has its own and its one-hop neighbor time slot and channel allocation information, the new wave leader just needs to send a request neighbor information message and collects all such information from its neighbors. Based on such information, the two-hop information can be derived. However, such two-hop information is only for the wave leader. In order to totally resolve conflict of allocation, the wave leader also needs to know its neighbor's two-hop neighbor information. In order get such information, a straightforward method would be sending allocation notification message over two hops. Such a method is not preferable since it requires the MAC layer signaling travels two hops for the same wave leader, which will make the protocol much more complicated. Fortunately, WAVE-DTCA does not rely on such a method. First of all, for a wave leader in DAP, the allocation information of its two-hop neighbors on the upstream has been sent to its neighbor, and there is not allocation yet for its two-hop neighbors in the down stream. For the scenario in AAP, it is also unnecessary to send two-hop neighbor information, which is discussed elsewhere in this document.

When two-hop information is available, the time slot and channel allocation is performed as follows: (1) The gateway checks the available time slots perceived by each link and then ranks the links in terms of the number of available time slots. The link with the smallest number of time slots is allocated with a time slot first. In case there is no time slot left, the number of time slots is expanded by one. Then, this new number is propagated to nodes in the network. This propagation is done independently via implicit signaling procedure via beacons. The reason for allocating a time slot to a link with smallest number of time slots is that this will maintain the number of time slots used in the network to be minimal; (2) For the link allocated a time slot, its channel is selected by considering the channels that have been used in all neighbors within two hops in the same time slot. Both destination and source of this link should be checked. Then, a non-conflict channel is selected. In case no non-overlapping channels can be selected, then a conflict channel has to be selected or expand number of time slots to find non-conflict channels. However, the former solution is preferred due to its simplicity; (3) When a link is done, the previous two steps are repeated until all links are allocated.

Determine the Set of Non-Overlapping Channels

The non-overlapping channels can be configured in advance for each mesh node. However, for the purpose of intelligent channel selection for avoiding interference in the environment, the non-overlapping channels are detected dynamically during run time. This can be done by combining the initial phase scanning when nodes boot up and on-line estimation of channel condition for channels that captured during the initial scanning process. Once a channel is detected to be busy, another best channel has to be selected. Channel condition can be detected based on first order and second order of the number of tries when the channel is used.

Dynamic Channel Selection for Interference Avoidance

During each channel and slot allocation period, each node needs to consider channel status based on interference monitoring. In order to obtain regional available channel information, the node needs to exchange the local scanned channel status with its immediate neighbors and two-hop-away nodes. After exchanging the necessary information, the node could figure out locally which channels can be used without disturbance when there is an active link between it and its neighbors. The node also needs to send its available channel list to two-hop-away nodes so that these nodes will not exhaust the channels on the list when they allocate the slot and channels based on DMT-MAC. If two-hop-away nodes occupy all the slots of the channels on the list (because they become wave leader earlier in DMT-MAC), the node will not find any slots on the channels with good quality and has to use the channel with interference.

Channel monitoring/evaluating and notification gives a list of channels that are good for transmission while DMT-MAC uses this list as a condition when allocating time slots and channels.

Passive Channel Scanning

Before getting into the details of passive scanning, we would like the answer the question as to why we cannot use a scheme that implements active scanning Typically in an active scanning system, the router would have to jump to each channel and spend certain amount of time listening for interference and presence of activities on nearby Kiyon nodes. This approach would mean no throughput for the clients (or active neighbors) connected to the routers during active scanning period. By implementing passive scanning, our network will have no down time and can continue to maintain an active link with neighboring routers (and client devices). Interestingly however, at boot-up time, the routers will run an active scan to discover non-interfering channels.

As mentioned earlier, the channel quality could be measured through the packet retransmission rate or the corrupted packet ratio. The packet retransmission rate represents the channel quality when the node is sending packets while the corrupted packet ratio reflects the channel status when the nodes is receiving packets or sensing the channel for the incoming traffic. Combining these two measurements will give a moderate channel description. For example, we can use packet retries as a measure of 'busy' channel. Since the amount of packets sent per unit time may be different, we cannot use the retry number directly. Instead, we need to have a percentage of retries (i.e. total_retries/total_packet for a given sample time). Based on a set threshold, the system will decide if the channel is 'clean' to use. In addition to retry percentage, we also need to maintain a count of the number of samples taken for each channel. This count is incremented every time the system decides to use this channel. It is decremented per sample period if the channel is not used. If the count drops to zero, the history is considered too old and gets deleted from the table. There are a few other parameters that will get considered for channel selection. They are described in the rest of the document.

However, within DMT-MAC, the node only monitors the channels in usage, which means that only the channels allocated by the node can be scanned. No information will be available for the rest of channels. Meanwhile, as the node may switch the channel in any frame, the channels are not scanned continuously. Thus, the information collected through the packet retransmission rate or the corrupted packet ratio does not represent the true channel status in certain period. For these reasons, the channel status measured locally may be biased and no current information is collected for unallocated channels. Then the exchange of channel status with neighboring nodes is necessary to compensate the missed channel information.

However, through the exchange of channel status information with neighbors, the node may still not get the full information about the channels which are allocated or not allocated by the node. And the local information of a node may not be useful to the neighbors if the distance between is far enough. When the node find that the current channel has severe interferences and there is not an efficient method to evaluate the rest of channels (there is not any record for the channel or the records are too old to be useful for evaluation), the DMT-MAC algorithm will choose a channel randomly from the list provided by the channel monitoring/evaluating/notifying process. If the newly chosen channel is still not in good quality, the channel monitoring/evaluating/notifying process will update the candidate channel list and next time when the DMT-MAC algorithm is executed another channel from the list is selected. Under this scenario, the channel monitoring/evaluating/notifying process requires a fast channel adjustment so that the node will not stick to a bad channel too long. If there is not a channel in good quality, the channel MEN process will provide a list that indicates the evaluation of every channel then the DMT-MAC algorithm could choose the "best" channel for transmission.

In most cases, the node could make a fair evaluation based on the collected information. By co-operating and sharing the channel selection parameters amongst neighbors, the nodes would have a bigger data sample to make their channel selection. FIG. 12 gives a possible channel status table that includes the local information and the information from the neighbors. The status of channels which are used before is also included so that the node could evaluate the channels based on these history records and decide to switch to which channel when the quality of channels in use becomes unacceptable.

In order to prevent information loop, the node should not send the information back to the source from which the information comes from. In simple solution, the node can only send its local channel status list to neighboring nodes. If more additional is required (such as the information from two-hop-away nodes) the channel status list should include the source for each item to eliminate the possibility of information loop.

Channel Evaluation

After having the channel status information, an algorithm is needed to evaluate the quality of channels. Not only the channels in use but also the channels not in use are required to be evaluated so that the best candidate channel can be selected when channel switching happens. The algorithm for the channel evaluation should combine the local and neighbor channel status and the historical information with different weights. A previous bad channel may become good after certain period so that this channel can be put back to the candidate channel list. Some channel information may not be complementary so that the evaluation algorithm should take it into account. For example, a probability for each channel could be set based on the percentage of measurement period and be used in this case for channel selection.

Channel Allocation Notification

Different regions have different view of the channels status so that at different regions nodes could select different set of channels in use or in candidate list. Because this channel selection scheme is to provide network status to the DMT-MAC algorithm, the DMT-MAC algorithm uses the provided information to allocate the time slots and channels in an efficient way. In some cases, some nodes may only have one or two channels with acceptable quality. Therefore, these nodes need to send their channel allocation list to nearby nodes within two hops (assuming the interference range is over two hops) for consideration during DMT-MAC allocation period. By doing this, the nearby nodes will use these channel allocation notification as a condition when they use DMT-MAC algorithm to select the time slot and channel in use. The object of channel allocation notification is to inform the neighboring nodes (which become the wave leader earlier) not to allocate all the bandwidth (time slots) of the channels which this node detects in good quality and plans to use.

To avoid interference, two-hop-away nodes need to receive the channel allocation notification of the node. After receiving all neighbors' information, the node will have a list of channels that can be used and will not cause the competition with neighbors (one hop and two hops away). For example, in a set of channels (52 56 60 64), the node senses that the channel 56 is in poor quality then the rest of channels are more suitable for use. After receiving the channel allocation requests (or just channel status information) from all one-hop-away or two-hop-away neighbors, the node may find that the channel 52 and 60 are not in good quality for the neighbors it may have direct connection. Thus, the channel 64 becomes the only available channel to use without any disturbance. Thus, the nodes executing DMT-MAC algorithm earlier and being in the interference range of the node should consider about this and not exhaust the channel 64. In case, when the node has active link with neighbors, some time slots on the channel 64 are available for the node and the transmission will have the least interferences.

Determining Next Wave Leader for Wave Propagation Path

The most critical part of DAP is to determine the next wave leader when a wave leader has done the time slot and channel allocation. The path following the wave leaders will be used in AAP too. Thus, there is no need of determining the next wave leader in AAP. Moreover, the path found in this algorithm will help other signaling messages to be quickly sent over to the entire network back and forth quickly. In other words, when all paths of wave leaders have been correctly formed, then wave propagation becomes so efficient since all waves are on their track.

The challenge of finding the next wave leader is two folds: finding the criterion that can be used to determine the next wave leader and resolving the issue when there could have multiple next wave leaders.

In WAVE-DTCA, the two issues are resolved in the following way: (1) For the current wave leader, find the number of independent set of neighbors that have not done allocation yet. In the same set of neighbors, all neighbors are connected directly or indirectly. Thus, nodes located in two independent set of neighbors have no path to be connected to each other through these neighbors, as shown FIG. 6; (2) The number of independent sets of neighbors is equal to the number of potential next wave leaders, called candidate wave leaders; (3) For multiple candidate wave leaders, the DAP cannot be started at the same time, since a loop of wave may exists, and thus a wave can starts at one candidate wave leader and reaches another candidate wave leader, as shown in FIG. 7. Such a loop should be avoided; otherwise, the allocation algorithm will fail, because only one wave leader is allowed to do the local time slot and channel allocation. In order to solve this problem, the following solution is proposed, as shown in FIG. 8.

Among all candidate wave leaders, only one can be selected as the first wave leader and then starts the wave propagation. The first one selected should be the one with the largest number of nodes in the set.

If the wave reaches the end node, the wave will reflect back until the point the parent wave leader of these candidate wave leaders. Then, the next one is selected, repeating steps i and ii, as shown in FIG. 8(a).

If the wave reaches another candidate wave leader, i.e, the candidate wave leader is selected as the next wave leader on this wave, then the candidate wave leader should send a macsig_revoke_candiate message to its parent wave leader. Once the message is received by the parent wave leader, it will remove the candidate wave leader from the list. In parallel, the candidate wave, after becoming the next wave leader, shall continue to propagate the wave.

If the end node is reached, the wave stops forwarding and reflects back to the process leader, as shown in FIG. 8(b).

However, if there is another node that needs to be the next wave leader, the wave keeps propagating, as shown in FIG. 8(c) and FIG. 8(d). Then steps i and ii are repeated.

It is possible that, as the wave goes on, another wave leader will have a list of multiple candidate wave leaders. In this case, the same procedure as set forth in FIGS. 7 and 8 can be applied.

After the wave reflects back to the process leader, then all wave leaders and the wave paths traversing these wave leaders are formed. These wave paths starts from the process leader as trees and do not intersect at other nodes.

As long as the process leader is not changed, the wave paths don't need to change. But to keep track of mobility and other network dynamics, all above procedures are just simply repeated periodically.

Exchange and Maintenance of Resource Information

As described in previous sections, there are several messages involved in the DAP. Once allocation is done on one wave leader, it has to notify all neighbor nodes of this wave leader. The allocation information sent to a node is stored in all neighbors. Each node, when is requested to send neighbor information, it also needs to send back its own allocation information and its neighbors allocation information. However, now two-hop neighbor information needs to be propagated and maintained on a node.

In-Network Interfering Nodes and Solutions

By using DMT-MAC and WAVE-DTCA, usually there are no hidden nodes and no interfering nodes, which is the advantage of multichannel TDMA MAC. However, if the network is not properly deployed, then interfering nodes still exist. As shown in FIG. 9(a), node S and node D is out of the communication range, but the signal is strong enough to cause interference to each other. Although Node S and Node D can communicate with each other through multiple hops, there is no way for them to ensure their time slots and channels do not conflict each other since they don't know how close they are to each other. We can such nodes multi-hop interfering nodes. For WAVE-DTCA, if there are only two hops in between Node S and Node D, the time slot and channels are guaranteed to have no conflict. However, as the number of hops greater than 2, then Node S and Node D can have conflict in their time slot and channel allocation.

Since it is nearly impossible to identify multi-hop interfering node, location based on scheme should be integrated. This solution, however, is not implemented in WAVE-DTCA. On the other hand, even if we can make sure Node S and Node D in FIG. 9 do not have conflict in time slot and channel allocation, it is not recommended to have such kind of topology, since Node S and Node D are so close, but they have to go through so many hops. Thus, unless there is no way to deploy another node in between Node S and Node D as shown in FIG. 9(b), the deployment of mesh network should make sure that multi-hop interfering node do not exist.

AAP

The flow chart of DAP has been shown in FIG. 4. Once DAP is done, AAP is started by the first wave leader, i.e., the process leader. The wave leader checks if any idle time slots are available. If there is no time slot, then the allocation at this wave leader will be skipped by sending a macsig_handover_aap message. When the next wave leader gets this message, it will repeat AAP from step 2. If there is time slot, The wave leader sends a macsig_request_neighbor_aap message to all its neighbors. Each neighbor sends back a macsig_reply_request_aap message to tell the wave leader its own and its neighbor's time slot and channel allocation information.

The wave leader determines time slot and channel allocation to all links, using the method explained elsewhere in this document. Once allocation is done, the wave leader notifies its neighbors of the results by sending a macsig_notify_adjustment message. Then it also notifies the next wave leader to start the wave by sending a macsig_start_nextaapwave message.

When the end node is reached, the last wave leader should send back a macsig_dap_finish message. All the parent wave leaders do the same until reaching the process leader. As explained in DAP, it is possible that some wave leaders have multiple next wave leaders. For such a wave leader, it needs to select which wave leader starts the wave first. Then, when the wave comes back (when getting the macsig_dap_finish), it knows if which next wave leader still needs to start a wave. Once all next wave leaders have done, the current wave leader will then send back the macsig_dap_finish message to its parent wave leader.

Once the process leader gets the macsig_dap_finish message and has made sure no other next wave leaders need to start waves, one round of AAP is finished. It should be noted that the macsig_dap_finish message also piggybacks the information of idle slots in the entire network.

If no time slots are available, then AAP is completed. Otherwise, another round of AAP starts, repeating all procedures in step 2.

As we can see in the AAP procedures, the differences of AAP and DAP mainly lies in two parts: (1) MP does not need to determine wave leaders or wave paths. In this sense, AAP is simpler. However, since more nodes have been allocated time slots and channels in this phase, allocation of time slots and channels is more challenging, although a similar algorithm is used. For example, the idle time slots are shared fairly among all active links; (2) DAP is carried out once, while AAP may need to be performed multiple times.

Localized Adjustment of Time Slot and Channel Allocation

Time slot and channel allocation depends on the collected information about time slot and channel allocation in one-hop and two-hop neighbors. Based on such information, time slots and channels are allocated as follows:

In a wave leader, it checks how many idle slots are available to each link. Also, it needs to determine how many other links in the neighbors are competing with this link.

Given available time slots and the number of competing links, the number of time slots that can be allocated to a node is determined by the available time slots divided by the number of competing links. In this way, other links also get a fair share of available time slots.

Once time slots are determined, the non-conflict channels are determined using the same scheme as explained in DAP.

Once a wave leader has done the allocation, the next one will take over until one round of AAP is completed. However, it is highly possible that there still have idle time slots in the network for two reasons:

The available time slots perceived by each link can be different. Thus, when each link gets an equal share of time slots, the aggregate time slots for all these links usually smaller than the actual number of available time slots, i.e., idle time slots are still available after one round of AAP is done.

Even if all links get the same vision of available time slots, the number may not be divisible by the number of competing links. Thus, after each link gets an equal share of time slots, there still have at least one idle time slots.

Exchange and Maintenance of Resource Information

Same as in DAP, the node only maintains the one-hop neighbors' allocation information and its own allocation information. Once its gets a request for neighbor information, it needs to send back such information to a requesting node.

When a node is notified of new allocation results in AAP, it needs to combine the new allocation information with the previous allocation information into the same allocation tables for itself and all of its one-hop neighbors.

For a wave leader, its neighbor's two-hop neighbor information can be collected using one-hop MAC layer signaling. For nodes in the upstream, the two-neighbor allocation has been sent to the wave leader's one-hop neighbor. For nodes in the downstream, in the DAP and previous rounds (if any) of AAP, the two-neighbor's allocation has also been sent to the wave leader's one-hop neighbor. In this way, the wave leader can always get its own two-hop neighbors allocation information and its neighbors' two-hop neighbor allocation information.

Periodical Time Slot and Channel Allocation

Once DAP and AAP are both done, which can be quick, the time slot and channel allocation is not started immediately. This is unnecessary, since the dynamics of link activity and topology change is usually much slower than the speed of DAP and AAP. In order to avoid unnecessary operation, once DAP and AAP are both done, the WAVE-DTCA is paused for a certain period, which is called the allocation period. The DAP will be started when a new allocation period starts. The length of the allocation period determines by the network dynamics. For example, if higher mobility is expected, a smaller allocation period needs to be employed.

Once DAP and AAP are both done, the nodes in the network start to use new allocation of time slots and channels for communications with their neighbors. Since different nodes in the network finishes the DAP and AAP at a different time, they do not have a common timing to decide if a new time slot and channel allocation should be used. Without synchronized the starting time, then time slots and channels used at different nodes will result in either conflict of allocation or working in different channels which further partitions the network. In order to avoid this issue, the solution is to synchronize the starting time of using a new time slot and channel allocation. This starting time is a certain period after the allocation starts. Such a period is called allocation start time. Thus, when a process leader starts DAP, its needs to embed its own TSF value into its macsig_request_-neighbor message. After DAP is done, all nodes in the network will ha e this same TSF value. Then, each node will just compare its own current TSF with the received TSF plus the allocation start time. If the two values are the same (by considering compensation of clock shift), a node starts to use the time slots and channels assigned in the latest period of resource allocation.

When a node starts to use new time slot and channel allocation, it needs to convert its number of time slots to a certain number is the best for achieving highest transport layer throughput, as explained in the next section.

In DAP and AAP, all time slots considered are defined as temporary time slots. As explained before, in order to achieve better performance in the transport layer for multi-hop communications, it is necessary to convert the temporary time slots to final time slots.

The number of time slots depends on the length of time slot which is determined by channel switching overhead. In our system, this is number is proved to be around 10, and it can be larger if channel switching becomes faster. Thus, the temporary time slots are converted as close to this number as possible. The key idea is that the allocation in temporary time slots is repeated multiple time slots until the total number of time slots is close enough to the number of final time slots. The idea is summarized below.

Assume the number of temporary time slots and final time slots is $N_t$, and $N_f$, respectively. The target number of time slots is $N_0$, which is 10 in our current system. Thus, the maximum repeating times of time slot and channel allocation, denoted by n is: $n = \text{floor}(N_0/N_t)$, where floor(x) is the flooring function to get the largest integer smaller than x. Thus, the actual number of final time slots is $N_f = n \times N_t = N_t \times \text{floor}(N_0/N_t)$.

Supposing the TDMA frame length is T, the time slot length $T_s$ is equal to $T_s = T/N_f = T_s N_t \times \text{floor}(N_0/N_t)$ Cross-Layer Design Stable and Consistent Network Topology MAC/routing cross-layer design can be carried out when DMT-MAC and WAVE-DTCA are applied. In the WAVE-DTCA, two features can be adopted to improve the performance of routing protocol:

The TDMA frame structure can be utilized to give a dedicated time slot to different signaling messages from higher protocol layers, in particular, routing protocol. With such a feature, the signaling messages in these protocols can be sent more quickly and reliably, which in turn improve the network stability.

The explicit signaling procedure can be used for sending routing messages too to improve the routing efficiency.

Fast Route Re-Discovery

WAVE-DTCA can help detect link failure faster than a routing protocol can do. More importantly, it can also reduce the time of finding another routing path, because the routing messages can be sent in a dedicate time slot. Cross-layer design between WAVE-DTCA has a great potential to achieve fast route re-discovery.

Power Management

Due to better control of medium access through TDMA, nodes can be controlled on/off more easily. Such a feature helps to implement power management schemes in 802.11 radios.

Stable Throughput for Large Bandwidth-Delay Product

In a TDMA network, when a time slot is relatively large, the delay over multiple hops can be large enough to impact the transport layer throughput, even though the bandwidth is high. This is the well-known large bandwidth-delay product issue. To solve this problem, one simple solution can rely on fine tuning the transport layer protocol parameters in mesh nodes and operation system on mesh clients. However, to have a scalable solution without touching operation system on clients, a better solution is to modify the transport protocol on mesh routers such that the large delay is invisible to the transport layer protocol on a client.

QoS of DMT-MAC can be provided via the QoS extension to WAVE-DTCA. QoS architecture of the DMT-MAC includes the following components: (1) QoS mapping: This is needed to find out the traffic specification of each traffic flow of different traffic types. This can be done by combining different schemes such as checking packets port number, type of service ID, traffic specifications in ATM networks and Internet InteServ model, DSCP in DiffServ model, signaling packets in application layer, and so on. QoS mapping can be integrated with network management protocol or work together with QoS profile on each mesh node; (2) QoS mechanism: Several QoS mechanisms are supported in DMT-MAC; (3) Per-hop mechanism (i) Traffic prioritization among different traffic types; (ii) Fair sharing of bandwidth among different traffic flows of the same traffic type; (4) Inter-link mechanism (i) Bandwidth for different links is dedicated, which is directly achieved through DMT-MAC (ii) Bandwidth for different links reflect different traffic load on each link. This needs extension of WAVE-DTCA such that time slots are allocated based on traffic load on a link instead of just link activity. Thus, traffic load estimation is implemented for each link too; (5) End to end admission control: Admission control avoids overbooking of bandwidth in the network. In order to carry out end to end admission, two schemes can be applied: (i) Periodical solution: In this solution, WAVE-DTCA can be directly applied. However, it can be slow when many applications need to be admitted; (ii) Localized solution: This needs modification to WAVE-DTCA so that a localized scheme can be applied without global coordination but still does not have chain reaction issue.

For either solution, QoS metrics are checked to determine if a new traffic flow can be accepted.

The more detailed descriptions about QoS will be provided in a separate document on QoS WAVE-DTCA.

QoS for wireless mesh networks includes the following:

QoS mapping: There are usually multiple different traffic data flows coming from the upper layers (application layer and network layer). We need to find the QoS requirement (or traffic specification) for every flow, so that it can be recognized and correctly handled in lower layers (MAC and physical layer). The typical QoS specifications include bandwidth, time delay, and priority. This can be done by combining different schemes such as checking packets port number, type of service ID, traffic specifications in ATM networks, Internet InteServ model and DSCP in DiffServ model, signaling packets in application layer, and so on. QoS mapping can be integrated with network management protocol or work together with QoS profile on each mesh node.

QoS mechanism: Several ideas are proposed to allocate or schedule appropriate resources for each traffic flow of different QoS specifications.

Traffic scheduling: There can be multiple different traffic flows between a source node S and a destination node D. Based on the given traffic specification, the flows are classified into different priority categories. High priority flows are typically control packet or multimedia data, such as video or audio, which has a strict time delay limit and needs to be sent out in a timely fashion. We propose two approaches to schedule traffic flows:

The higher priority flows have a higher probability to be sent out.

If there are multiple flows in the same priority category, they are scheduled with equal probability to be sent out.

Bandwidth allocation: For each link between node S and D, there are multiple different traffic flows, in which each flow may require different bandwidth. Assigning the same amount of bandwidth for each link may not be fair for the multiple flows within each link. So instead of assigning bandwidth based on active links, we propose to assign bandwidth specifically for every active data flow. The flows are firstly classified into two categories:

Some flow requires fixed amount of bandwidth. For example, an audio flow usually needs 64 kpbs, while a video flow may need 2 Mbps. Such bandwidth requirement is given in the above traffic specification;

Some flow requires as much as possible bandwidth. For example the TCP best-effort data traffic.

The basic idea of the proposed bandwidth allocation algorithm is:

The category 1) flows are firstly allocated with just enough bandwidth;

If there is remaining bandwidth, it is equally shared among all category 2) flows.

Localized admission control: Admission control avoids overbooking of bandwidth or overloading the network. We propose a localized admission control algorithm which controls and schedules the incoming traffic flows. The basic idea is:

When the aggregated bandwidth of all incoming flows is less than the available bandwidth, or when the incoming packet buffer is not overloaded, no admission control is needed.

When the incoming packet buffer is close to be full, the incoming traffic flows are selected based on their priority: the higher priority flow has a better chance to go through.

When the incoming packet buffer is full, no further packet will be admitted.

Multi-Radio Mesh Networking

There are two options when a multi-radio mesh networking is developed:

Option 1: The time slot and channel allocation algorithm is based on the algorithm for single-radio; no optimization is required to minimize the times of channel switching for end-to-end communications Option 2: The time slot and channel algorithm needs to minimize the times of channel switching.

For both options 1 & 2, significant throughput can be achieved. The latency can also be much better than that of single-radio mesh networking. However, to minimize the latency, option 2 is needed.

The basic idea of option 1 is: radios on the same node perform the same procedure of time slot and channel allocation as that for single-radio mesh, but choose different channels in the same time slots. The operation procedures are explained as follows: (1) One radio on each node is fixed on a common channel when it is initialized; (2) The MAC layer signaling for time slot/channel allocation is performed in this radio in a common time slot; (3) The time slot and channel allocation algorithm for the single-radio mesh networking is adopted to allocate time slots/channels for each node radio-by-radio. In other words, for every node in the entire network, the allocation is done for one first, then the next one. It should be noted that nodes can have a different number of radios. Thus, when the allocation algorithm runs for the second radio, some nodes do not need to be allocated any time slots/channels, but they need to relay the MAC layer signaling packets; (4) In order to reduce latency and interference, starting from the second radio, the allocation of time slots and channels must consider: (a) interleaving time slots with those allocated for previous radios; (b) allocate channels for interleaved time slots.

Other time slot and channel allocation, the packet queuing module of the multichannel MAC for single-radio need to be modified as follows:

Packet queuing must be based on per-destination rather than per-MAC or per-radio; moreover, packet transmissions to the same destination in the same time slot by different radios must be carried out in a round robin fashion.

Figure 13:
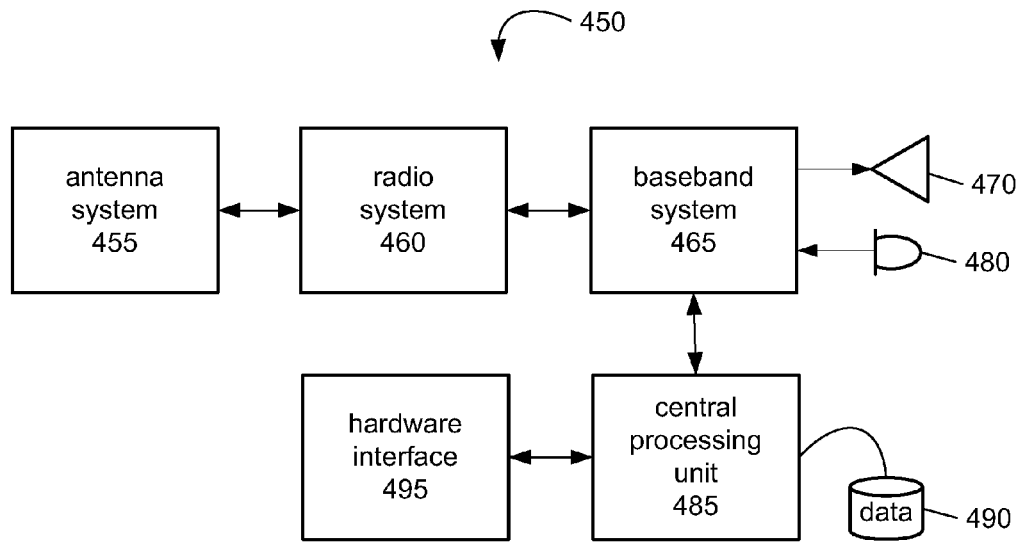
FIG. 13 is a block diagram illustrating an example wireless communication device that may be used in connection with various embodiments described herein.

FIG. 13 is a block diagram illustrating an example wireless communication device 450 that may be used in connection with various embodiments described herein. Other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 14:
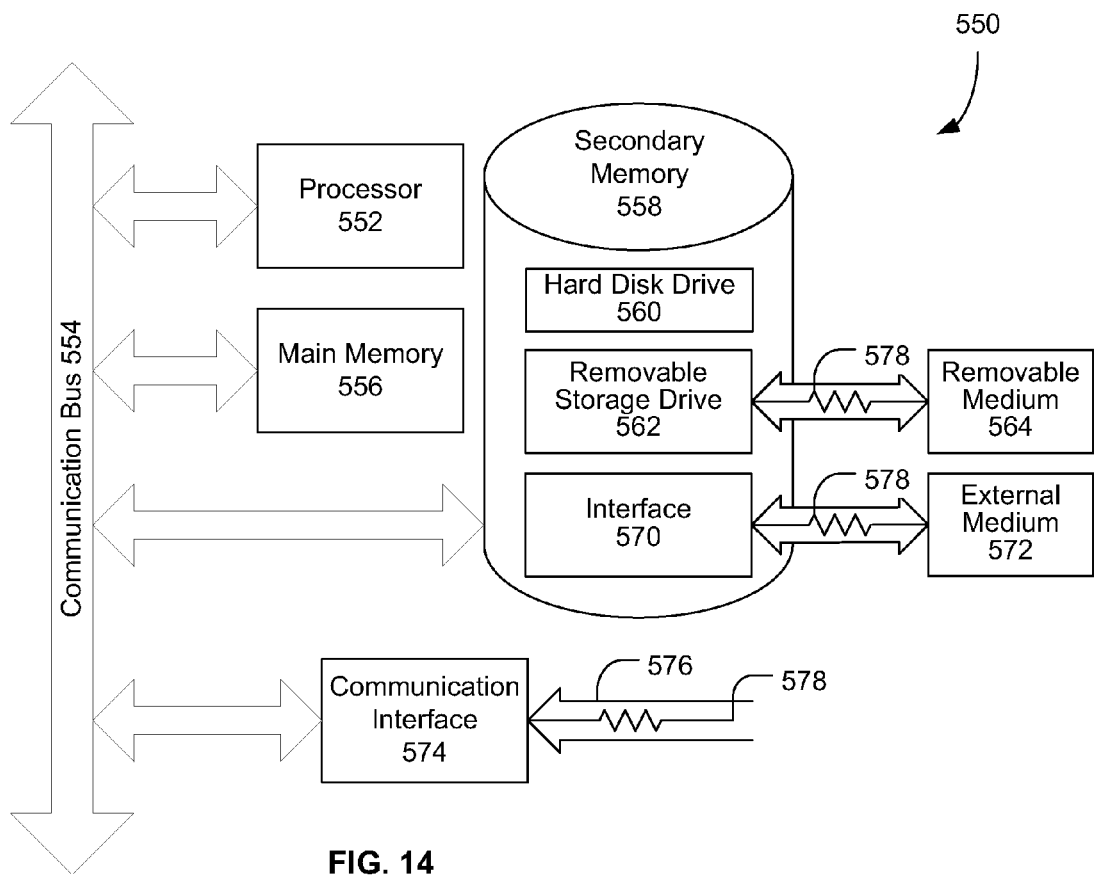
FIG. 14 is a block diagram illustrating an example computer system that may be used in connection with various embodiments described herein.

FIG. 14 is a block diagram illustrating an example computer system 550 that may be used in connection with various embodiments described herein. Other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A method for time division multiple access timeslot and channel allocation in a wireless communication network having a plurality of nodes comprising:
during a distributed allocation phase, a particular node of the plurality of nodes acting as a current distributed-allocation leader node, wherein acting as a current distributed-allocation leader node comprises:
allocating timeslots to active links between the particular node and neighboring nodes,
allocating channels for the allocated timeslots;
selecting a new distributed-allocation leader node from among the plurality of nodes; and
during a subsequent allocation adjustment phase, the particular node acting as a current allocation-adjustment leader node, wherein acting as a current allocation-adjustment leader node comprises:
identifying a maximum number of time slots;
identifying one or more additional timeslots available for allocation based on a difference between the timeslots allocated by the particular node during the distributed allocation phase and the maximum number of time slots;
allocating the one or more additional timeslots and corresponding channels to one or more active links between the particular node and one or more neighboring nodes; and
selectin a new allocation-adjustment leader node from among the plurality of nodes.

2. The method of claim 1, wherein the wireless communication network is one of a WiMAX network, a 802.11 network, and a sensor network.

3. The method of claim 1, wherein the distributed allocation phase further comprises the particular node, in response to receiving a notification that a last node in a path has been reached, forwarding the notification to a parent node.

4. The method of claim 1, further comprising receiving an instruction from a parent node identifying the particular node as a candidate distributed-allocation leader node.

5. The method of claim 4, further comprising in response to receiving a request to act as a current distributed-allocation leader node by a second node different from the parent node, the particular node responsively transmitting a revocation message to the parent node.

6. The method of claim 1, wherein selecting a new distributed-allocation leader node comprises identifying a plurality of candidate distributed-allocation leader nodes and selecting one of the candidate distributed-allocation leader nodes as the new distributed-allocation leader node.

7. The method of claim 6, wherein the selected candidate distributed-allocation leader node is the node with the largest number of connected neighboring nodes.

8. The method of claim 1, further comprising, during the distributed allocation phase, the particular node receiving synchronization timing information from an initiating node.

9. The method of claim 8, further comprising, at a time identified by the synchronization timing information, the particular node using the allocated channels and timeslots to transmit packets to one or more neighboring nodes.

10. The method of claim 1, wherein the neighboring nodes are identified as those network nodes within one communication hop of the particular node.

11. The method of claim 10, wherein ten time slots are assigned to the active links between the particular node and the neighboring nodes.

12. The method of claim 1, wherein identifying the maximum number of time slots comprises determining a largest number of time slots assigned to any one node out of the plurality of nodes in the network during the distributed allocation phase.

13. A wireless communication device supporting time division multiple access timeslot and channel allocation in a wireless communication network and configured to:

during a distributed allocation phase, act as a current distributed-allocation leader node, wherein being configured to act as a distributed-allocation leader node comprises being configured to:
  allocate timeslots to active links between the communication device and neighboring nodes in the network,
  allocate channels for the allocated timeslots;
  select a new distributed-allocation leader node from among the plurality of nodes; and
during a subsequent allocation adjustment phase, act as a current allocation-adjustment leader node, wherein being configured to act as an allocation-adjustment leader node comprises being configured to:
  identify a maximum number of time slots;
  identify one or more additional timeslots available for allocation based on a difference between the timeslots allocated by the communication device during the distributed allocation phase and the maximum number of time slots;
  allocate the one or more additional timeslots and corresponding channels to one or more active links between the communication device and one or more neighboring nodes; and
  select a new allocation-adjustment leader node out of the plurality of nodes.

14. The device of claim 13, wherein the wireless communication network is one of a WiMAX network, a 802.11 network, and a sensor network.

15. The device of claim 13, wherein the communication device is further configured to receive a notification that a last node in a path has been reached during the distributed allocation phase and forward the notification to a parent node.

16. The device of claim 13, wherein the communication device is further configured to receive an instruction from a parent node identifying the particular node as a candidate distributed-allocation leader node.

17. The device of claim 16, wherein the communication device is further configured to receive a request to act as a current distributed-allocation leader node by a second node different from the parent node, and in response, to transmit a revocation message to the parent node.

18. The device of claim 13, wherein the communication device is further configured to select the new distributed-allocation leader node by a process comprising: identifying a plurality of candidate distributed-allocation leader nodes and selecting one of the candidate distributed-allocation leader nodes as the new distributed-allocation leader node.

19. The device of claim 18, wherein the selected candidate distributed-allocation leader node is the candidate node with the largest number of neighboring nodes.

20. The device of claim 13, wherein the communication device is further configured to, during the distributed allocation phase, receive synchronization timing information from an initiating node.

21. The device of claim 20, wherein the communication device is further configured to, at a time identified by the synchronization timing information, use the allocated channels and timeslots to transmit packets to one or more neighboring nodes.

22. The device of claim 13, wherein the neighboring nodes are identified as those network nodes within one communication hop of the communication device.

23. The device of claim 22, wherein ten time slots are assigned to the active links between the communication device and the neighboring nodes.

24. The device of claim 13, wherein the communication device is configured to identify the maximum number of time slots by determining a largest number of time slots assigned to any one node out of the plurality of nodes in the network during the distributed allocation phase.

25. An article of manufacture including a computer readable medium having instructions stored thereon that, in response to execution by a computing device, cause the computing device to perform operations in a wireless communication network comprising:
  during a distributed allocation phase, the computing device acting as a current distributed-allocation leader node, wherein acting as a current distributed-allocation leader node comprises:
    allocating timeslots to active links between the computing device and neighboring nodes,
    allocating channels for the allocated timeslots;
    selecting a new distributed-allocation leader node from among the plurality of nodes; and
  during a subsequent allocation adjustment phase, the computing device acting as a current allocation-adjustment leader node, wherein acting as an allocation-adjustment leader node comprises:
    identifying a maximum number of time slots;
    identifying one or more additional timeslots available for allocation based on a difference between the timeslots allocated by the computing device during the distributed allocation phase and the maximum number of time slots;
    allocating the one or more additional timeslots and corresponding channels to one or more active links between the computing device and one or more neighboring nodes; and
    selecting a new allocation-adjustment leader node from among the plurality of nodes.

26. The article of manufacture of claim 25, wherein the wireless communication network is one of a WiMAX network, a 802.11 network, and a sensor network.

27. The article of manufacture of claim 25, wherein the operations further comprise, during the distributed allocation phase and in response to receiving a notification that a last node in a path has been reached, forwarding the notification to a parent node.

28. The article of manufacture of claim 25, wherein the operations further comprise, receiving an instruction from a parent node identifying the computing device as a candidate distributed-allocation leader node.

29. The article of manufacture of claim 28, wherein the operations further comprise receiving a request to act as a current distributed-allocation leader node by a second node different from the parent node, and in response, transmitting a revocation message to the parent node.

30. The article of manufacture of claim 25, wherein selecting a new distributed-allocation leader node comprises identifying a plurality of candidate nodes and selecting one of the candidate nodes as the new distributed-allocation leader node.

31. The article of manufacture of claim 30, wherein the selected candidate distributed-allocation leader node is the candidate node with the largest number of connected neighboring nodes.

32. The article of manufacture of claim 25, wherein the operations further comprise, during the distributed allocation phase, receiving synchronization timing information from an initiating node.

33. The article of manufacture of claim 32, wherein the operations further comprise, at a time identified by the synchronization timing information, the computing device using the allocated channels and timeslots to transmit packets to one or more neighboring nodes.

34. The article of manufacture of claim 25, wherein the neighboring nodes are identified as those network nodes within one communication hop of the computing device.

35. The article of manufacture of claim 34, wherein ten time slots are assigned to the active links between the computing device and the neighboring nodes.

36. The article of manufacture of claim 25, wherein identifying the maximum number of time slots comprises determining a largest number of time slots assigned to any one node out of the plurality of nodes in the network during the distributed allocation phase.

37. A wireless communication device supporting time division multiple access timeslot and channel allocation in a wireless communication network and comprising:
  means for acting as a current distributed-allocation leader node during a distributed allocation phase, wherein acting as a current distributed-allocation leader node comprises:
    allocating timeslots to active links between the communication device and neighboring nodes,
    allocating channels to the allocated timeslots;
    selecting a new distributed-allocation leader node from among the plurality of nodes; and
  means for acting as a current allocation-adjustment leader node during a subsequent allocation adjustment phase, wherein acting as a current allocation-adjustment leader node comprises:
    identifying a maximum number of time slots;
    identifying one or more additional timeslots available for allocation based on a difference between the timeslots allocated by the communication device during the distributed allocation phase and the maximum number of time slots;
    allocating the one or more additional timeslots and corresponding channels to one or more active links between the communication device and one or more neighboring nodes; and
    selecting a new allocation-adjustment leader node from among the plurality of nodes.

* * * * *

UNITED STATES PATENT AND TRADEMARK OFFICE
CERTIFICATE OF CORRECTION

PATENT NO.        : 8,040,857 B2                                                      Page 1 of 1
APPLICATION NO.   : 11/952948
DATED             : October 18, 2011
INVENTOR(S)       : Wang et al.

It is certified that error appears in the above-identified patent and that said Letters Patent is hereby corrected as shown below:

On Title Page 3, item (56), under "Other Publications", Line 1, delete "for for" and insert -- for --.

On Title Page 3, item (56), under "Other Publications", Line 25, delete ""Intereference-Aware" and insert -- "Interference-Aware --.

Column 26, line 22, in Claim 1, delete "selectin" and insert -- selecting --.

Signed and Sealed this
Twenty-sixth Day of June, 2012

David J. Kappos
*Director of the United States Patent and Trademark Office*